(12) United States Patent
Bosk

(10) Patent No.: US 8,439,763 B2
(45) Date of Patent: May 14, 2013

(54) WEDGE CLUTCH ASSEMBLY

(75) Inventor: Brian K. Bosk, Escanaba, MI (US)

(73) Assignee: Brian K. Bosk, Escanaba, MI (US)

( * ) Notice: Subject to any disclaimer, the term of this patent is extended or adjusted under 35 U.S.C. 154(b) by 92 days.

(21) Appl. No.: 13/108,858

(22) Filed: May 16, 2011

(65) Prior Publication Data

US 2011/0214960 A1    Sep. 8, 2011

Related U.S. Application Data

(63) Continuation-in-part of application No. 12/285,130, filed on Sep. 29, 2008, now abandoned, which is a continuation-in-part of application No. 11/316,963, filed on Dec. 27, 2005, now abandoned, which is a continuation-in-part of application No. 11/050,786, filed on Jan. 27, 2005, now abandoned, which is a continuation-in-part of application No. 10/317,140, filed on Dec. 12, 2002, now Pat. No. 6,848,998.

(51) Int. Cl.
  *F16D 7/02* (2006.01)

(52) U.S. Cl.
  USPC .......................................................... 464/43

(58) Field of Classification Search . 464/42–44; 440/49, 440/84
  See application file for complete search history.

(56) References Cited

U.S. PATENT DOCUMENTS

| | | | |
|---|---|---|---|
| 788,810 A | 5/1905 | Ambler | |
| 1,002,310 A * | 9/1911 | Procunier | 464/44 X |
| 1,667,864 A | 5/1928 | Maley | |
| 1,895,402 A | 1/1933 | Sobey | |
| 1,897,322 A | 2/1933 | Montgomery | |
| 1,936,713 A | 11/1933 | Freeman et al. | |
| 2,236,854 A | 4/1941 | Ocenasek | |
| 2,428,973 A | 10/1947 | Kelsey | |
| 2,530,796 A | 11/1950 | Weyant | |
| 2,569,144 A | 9/1951 | Benson | |
| 2,751,987 A | 6/1956 | Kiekhaefer | |
| 3,625,292 A | 12/1971 | Lay | |
| 3,648,483 A | 3/1972 | Garcia, Jr. | |
| 3,701,403 A | 10/1972 | Peterson | |
| 3,752,278 A | 8/1973 | States | |
| 4,053,980 A | 10/1977 | Poehlman | |
| 4,066,136 A | 1/1978 | Wanner et al. | |
| 4,606,443 A | 8/1986 | Kimura | |

(Continued)

FOREIGN PATENT DOCUMENTS

| | | |
|---|---|---|
| DE | 3807308 | 9/1989 |
| DE | 4101705 | 3/1992 |
| FR | 2799113 | 4/2001 |
| KR | 1020050005131 | 1/2005 |

OTHER PUBLICATIONS

Website, http://wcbosk.com/, The Bosk Clutch, one sheet printed from the internet on May 19, 2010.

*Primary Examiner* — Gregory Binda

(57) ABSTRACT

The wedge clutch assembly is a clutch assembly for power tools, drilling rigs and like machinery utilizing rotating drills. In at least one embodiment the wedge clutch assembly has a pinion shaft adapted in shape to support a pinion gear, a bronze clutch cup, an optional thrust bearing, and a steel wedge clutch spring washer retained by a fastener. A further embodiment is particularly adapted for installation in the hub of a watercraft propeller. This watercraft propeller clutch embodiment deletes the clutch cup and includes opposite end caps to seal the assembly.

20 Claims, 18 Drawing Sheets

U.S. PATENT DOCUMENTS

| | | |
|---|---|---|
| 4,809,572 A | 3/1989 | Sasaki |
| 5,060,772 A | 10/1991 | Anders et al. |
| 5,094,133 A | 3/1992 | Schreiber |
| 5,134,909 A | 8/1992 | Sasaki |
| 5,138,916 A | 8/1992 | Sato et al. |
| 5,350,026 A | 9/1994 | Markus et al. |
| 5,372,206 A | 12/1994 | Sasaki et al. |
| 5,415,575 A | 5/1995 | Karls |
| 5,538,089 A | 7/1996 | Sanford |
| 5,566,458 A | 10/1996 | Bednar |
| 5,573,091 A | 11/1996 | Hung |
| 5,778,989 A | 7/1998 | Newmaier |
| 6,056,101 A | 5/2000 | Kataoka |
| 6,283,226 B1 | 9/2001 | Chen |
| 6,439,091 B1 | 8/2002 | Dibbern et al. |
| 2002/0062967 A1 | 5/2002 | Ziegler |
| 2005/0139445 A1 | 6/2005 | Bosk |
| 2006/0135267 A1 | 6/2006 | Bosk |
| 2009/0038904 A1 | 2/2009 | Bosk |

\* cited by examiner

WEDGE CLUTCH ASSEMBLY

CROSS-REFERENCE TO RELATED APPLICATION

This is a continuation-in-part of my prior application Ser. No. 12/285,130, filed on Sep. 29, 2008, now abandoned, which is a continuation-in-part of application Ser. No. 11/316,963, filed on Dec. 27, 2005, now abandoned, which is a continuation-in-part of application Ser. No. 11/050,786, filed on Jan. 27, 2005, now abandoned, which is a continuation-in-part of application Ser. No. 10/317,140, filed Dec. 12, 2002, now issued as U.S. Pat. No. 6,848,998.

BACKGROUND OF THE INVENTION

1. Field of the Invention

The present invention relates generally to gear systems. More specifically, the invention is a wedge clutch assembly for insertion in rotary power devices to prevent damage to a gear or other drive system upon excessive stress.

2. Description of the Related Art

The related art of interest describes various clutch assemblies, but none of the cited references discloses the present invention. There is a need to provide a mechanism to avoid gear failure in power hand tools, well drilling apparatus, watercraft drives, and other rotary power devices and equipment. The relevant art will be discussed in the order of perceived relevance to the present invention.

U.S. Patent Application Publication No. 2002/0062967, published on May 30, 2002, describes an electrical handheld power tool with an electromagnetic safety clutch provided between a pinion shaft and a rotor shaft. The pinion shaft is formed as a hollow shaft provided in its interior with an inner bearing, which rotatably supports the pinion shaft. The rotor shaft has its end received in the interior of the pinion shaft and supported against the inner bearing. The safety clutch is distinguishable for requiring an electromagnetic means.

U.S. Pat. No. 3,625,292, issued on Dec. 7, 1971 to Michael T. Lay, describes an insulated slip clutch for a power cutting tool such as a lawn edger and grass trimmer. A slip clutch made of Belleville washer springs is held in place by a retaining nut which allows the D-shaped end of the drive shaft to continue to rotate, but to immobilize the drive pinion and any cutting motion. The slip clutch is housed between the cutting blade and a plastic casing in two insulating cups and a liner with a D-shaped hole. The clutch assembly is deemed distinguishable for requiring the driving shaft end to have a flattened D-shaped cross-section, Bellville washer springs and a two-cup insulating casing.

U.S. Pat. No. 4,606,443, issued on Aug. 19, 1986 to Misao Kimura, describes a planetary drive with an overload clutch release means for a telescopic antenna comprises an intermediate gear which meshes with a gear portion provided on an inner surface of a driven rotary member and a clutch gear which meshes with the intermediate gear to comprise the planetary gears. The clutch assembly is distinguishable for requiring a planetary drive with an intermediate gear for raising and lowering a telescopic antenna.

U.S. Pat. No. 3,752,278, issued on Aug. 14, 1973 to Ronald F. States, describes an improved power operated wrench or screwdriver having two dog clutches in series for the transmission of the drive in which one is a torque sensitive dog clutch having ramped interengaging driving surfaces adapted to be induced to become displaced against the action of a spring when the torque applied by the tool exceeds a predetermined value. The other dog clutch is a non-torque sensitive clutch that is adapted to become disengaged by displacement of the torque sensitive clutch. The dog clutches are distinguishable for requiring two having different torque sensitivities.

U.S. Pat. No. 4,053,980, issued on Oct. 18, 1977 to Arthur G. Poehlman, describes a chain saw featuring an over-torque releasing clutch mechanism comprising a drive member driven by the drive shaft and a driven member for rotating the chain sprocket. One of the members is axially movable relative to the other between an engaged or driving position and a released position wherein they are disengaged from each other. The drive and driven members have intermeshing clutch teeth, which co-act to produce an axial force in a direction tending to separate the members, which are releasably held by a resilient member. The clutch mechanism is distinguishable for requiring intermeshing clutch teeth.

U.S. Pat. No. 4,066,136, issued on Jan. 3, 1978 to Karl Wanner et al., describes a torque and impulse transmitting portable hammer drill having a safety overload clutch mechanism inserted in series between the rotary shaft of the motor and the tool to terminate the transmission of torque from the rotary shaft to the tool when resistance to rotation exceeds a predetermined value. An intermediate gear with smaller teeth is positioned between the crank gear and the coupling gear. The clutch is distinguishable for requiring a third gear.

U.S. Pat. No. 4,809,572, issued on Mar. 7, 1989 to Katsuhiko Sasaki, describes a power driven screwdriver having a claw clutch comprising a fixed clutch member with teeth on the end of a main gear on a support shaft. The spindle has a movable clutch member with teeth and an engaging ball in an inclined groove. A spring is located between the movable clutch member and the fixed clutch member. The claw clutch is distinguishable for requiring engaging teeth and an engaging ball.

U.S. Pat. No. 4,883,130, issued on Nov. 28, 1989 to Paul H. Dixon, describes a rotating dual speed transmission for a screw fastener driving tool of an automatic assembly machine which acts in conjunction with two torque-responsive clutches to tighten a threaded fastener such as a screw or a nut during rotation of the spindle. A first torque-responsive clutch automatically switches the drive from a fast speed to a slow speed when torque of a predetermined magnitude is imposed on the fastener, and a second torque-responsive clutch automatically interrupts the drive to the fastener when torque of a higher predetermined magnitude is imposed on the fastener. The first lower clutch has lugs that lock with the lower cam segments supported with a coil spring around the spindle. The upper clutch has lugs that lock with the jaw members of the lower clutch. The clutches are distinguishable for requiring locking elements such as lugs and cam segments.

U.S. Pat. No. 4,967,888, issued on Nov. 6, 1990 to Wolfgang Lippacher et al., describes a safety clutch for a motor-driven hammer drill that breaks the rotational drive train when a working tool becomes seized in a receiving material. A pair of coupling balls upon seizure leave their recesses in the power take-off spindle housing to permit the drive to continue to rotate. However, the motor must be stopped and restarted. The safety clutch assembly is distinguishable for requiring coupling balls.

U.S. Pat. No. 5,060,772, issued on Oct. 29, 1991 to Heinz-Gerhard Anders et al., describes a pneumatic power-operated screwdriving tool that includes a switching clutch to transfer the torque from the drive shaft to an output shaft when the tool seizes. The driver has a first clutch having clutch coupling jaws at its end that engages the coupling jaws of the second clutch. The clutch system is distinguishable for requiring two engaging clutches with jaws.

U.S. Pat. No. 5,094,133, issued on Mar. 10, 1992 to Wolfgang Schreiber, describes a power-operated screwdriver with a switch-off means for screw-in depth and screw-in torque having three clutch elements. A first clutch element is arranged between the drive and the tool drive shaft, and transferable by axial displacement of the tool drive shaft from a rest position to a working position. A second clutch element connected to the tool drive shaft. A third clutch element arranged between the first and second clutch elements forms an entrainment clutch with the first clutch element and forms a release clutch with the second clutch element. The clutch system is distinguishable for requiring three connecting clutches.

U.S. Pat. No. 5,134,909, issued on Aug. 4, 1992 to Katsuhiko Sasaki, describes a power driven screwdriver including a driving or frictional clutch mechanism interposed between the drive motor and the spindle. A claw clutch mechanism is interposed between the spindle and a second driving member that is separated from a first driving member. The clutch system is distinguishable for requiring a frictional clutch and a claw clutch.

U.S. Pat. No. 5,138,916, issued on Aug. 18, 1992 to Yuichi Sato et al., describes a power operated screwdriver having two clutches, a compression spring between a support shaft and an intermediate clutch disc and urges the clutch disc toward the main spindle to disengage the first clutch. The clutch system is distinguishable for requiring two clutches.

U.S. Pat. No. 5,350,026, issued on Sep. 27, 1994 to Heule Markus et al., describes an electric power-driven screw-driver having a single friction coupling consisting of first and second coupling elements that undoes the drive connection between a driving electric motor and the tool output shaft.

U.S. Pat. No. 5,372,206, issued on Dec. 13, 1994 to Katsuhiko Sasaki et al., describes a tightening tool including a drive member rotatably driven by a motor. An intermediate member is interposed between the drive member and a spindle, and rotatable with the drive member. A claw clutch is formed between the spindle and the drive member. The clutch system is distinguishable for requiring a claw clutch.

U.S. Pat. No. 5,538,089, issued on Jul. 23, 1996 to Christopher P. Sanford, describes a power tool clutch assembly having a first spindle configured to rotate in a gear case. A drive clutch element is fixed to the first spindle. A second spindle rotates independently of the first spindle. An output clutch element is fixed to the second spindle. A compression spring is provided between the intermediate and output clutch elements. The clutch housing and clutch components can be removed from a power tool gear casing for easy service. The clutch assembly is distinguishable for requiring two clutches.

U.S. Pat. No. 5,566,458, issued on Oct. 22, 1996 to Thomas R. Bednar, describes two embodiments of a clutch mechanism for reciprocating saws having a wobble plate drive member including a spindle reciprocally supported by the housing, and a clutch drivingly connecting the motor to the shaft and providing slippage between the motor and the shaft if there is binding of the spindle. The clutch mechanisms are distinguish-able for requiring structurally different elements.

U.S. Pat. No. 5,573,091, issued on Nov. 12, 1996 to Michael Hung, describes an electrically powered or manually driven clutch and brake assembly for an electric winch cooperating with a transmission assembly. The clutch mechanism is provided with a thrust bearing on a clutch shaft, and a large clutch gear is inserted thereon. A lining plate is attached to a clutch plate of the large gear, and a pinion gear is attached tightly to the lining plate. Another thrust bearing is placed behind the pinion gear and a compression spring is inserted on the clutch shaft. The large gear and the pinion gear are pushed tightly together or loosened as a function of the resiliency of the spring. A clutch hand wheel can be provided for manual operation. The clutch mechanism is distinguishable for requiring a large clutch gear, a lining plate and two thrust bearings.

U.S. Pat. No. 5,622,230, issued on Apr. 22, 1997 to David A. Giardino et al., describes a rotary impact wrench clutch comprising a two-part, readily assembled and disassembled pin cage-coupler. One part is a cylindrical, longitudinally grooved cage contains a clutch mechanism and capped at one end by a lobed end plate coupler. The clutch device is distinguishable for requiring a pin-cage coupler.

U.S. Pat. No. 5,778,989, issued on Jul. 14, 1998 to Anton Neumaier, describes a manually operable screw driving tool having a drive pinion axially fixed with a housing. A spindle in the housing is axially displaceable relative to the drive pinion against the force of a first spring. A clutch element is located in a passageway in a collar on the drive pinion, and is radially displaceable by an actuating member for engaging the spindle to the drive pinion. In the engaged position the clutch element sits against a stop surface in the spindle. The actuation member is axially displaceable by stops located on the spindle, and can be axially fixed to the drive pinion by a retaining element and a snap-element. The clutch element is distinguishable for requiring an actuation member axially displaceable by stops on the spindle.

U.S. Pat. No. 6,283,226 B1, issued on Sep. 4, 2001 to Kenneth Chen, describes a clutch-buffer assembly for a power wrench comprising a driven wheel having an outwardly positioning tube disposed at a power-input end. A retaining spring, a retaining disc, a driven gear, an anchor ring, and a reversible motor are collared onto the positioning tube sequentially. The retaining disc is limited to move back and forth along the positioning tube without rotation. A pair of protruding teeth and reception cavities in respective contact faces of the retaining disc and the driven gear, and the reversible motor is used to drive the driven gear. When the driven wheel rotates at a higher speed, the retaining disc can be detached from the driven gear for control of the power consumption to lessen the imposed load in order not to blow a fuse. The clutch-buffer assembly is distinguishable for requiring a pair of protruding teeth and reception cavities in the respective contact faces of the retaining disc and the driven gear.

U.S. Pat. No. 6,439,091 B1, issued on Aug. 27, 2002 to John E. Dibbern et al., describes a clutch mechanism for a power tool having a hole and first and second clamps connected to the arbor to clamp the blade. One of the cutting tools and at least one of the first and second clamps and arbor have a first drive surface for contacting a second drive surface on the other of the cutting tool, and at least one of the first and second clamps and arbor. The second drive surface is movable between a first position and a second position bypassing the first drive surface. The second drive surface is resiliently connected to the other of the cutting tool and at least one of the first and second clamps and arbor. At least one metal strip connects the second drive surface to the other of the blade and at least one of the first and second clamps and arbor. The clutch mechanism is distinguishable for requiring two clamps for the blade and first and second drive surfaces.

German Patent Publication No. 3,807,308, published on Sep. 14, 1989, describes a radially acting safety friction clutch positioned inside a component of a power tool with an axial mode of action to obtain a shorter and more compact tool. The clutch has compression or cup springs. The clutch is distinguishable for requiring a radially acting safety friction clutch assembly.

German Patent Publication No. 4,101,705, published on Mar. 26, 1992, describes a positive, frictionless clutch for a hedge trimmer that has a locking ring to disengage the main gear from a driven bushing by moving two drive rollers into a clear space. The clutch assembly comprises a main drive gear, the driven bushing and a locking ring mounted co-axially on a fixed central shaft. One end of the drive bushing has eccentrics that drive the trimmer blades. Roller located in apertures of the driven bushing transmit the drive through ledges on the inside diameter of the main drive gear. When the trimmer handle grips are released a stop pin enters a hole in the flange of the locking ring and prevents rotation. The main drive gear and the driven bushing continue rotating, causing the rollers to enter a clear space between the two members and immediately disengaging the drive. A preloading coil spring connects the locking ring to the driven bushing, and together with friction brings the trimmer blades to rest. The clutch assembly is distinguishable for requiring an eccentric drive bushing containing two rollers.

French Patent Publication No. 2,799,113, published on Apr. 6, 2001, describes a jointed dental hand drill as a continuously rotating instrument having a torque limiter in the form of a spring-loaded sliding gear clutch on the primary drive shaft and a fixed gear on the secondary drive shaft. In the event of a set torque being exceeded, the sliding gear moves along the primary shaft against the pressure of the spring and disengages the transmission. The two gears have asymmetrical teeth to give different torque levels according to the direction of motion. The dental drill clutch system is distinguishable for requiring asymmetrical gear teeth on two gears.

Korean Patent Publication No. 1020050005131 published on Jan. 13, 2005 describes (according to the single drawing Figure and English abstract) a wedge-type clutch assembly having a male conical component engaging a slotted female conical component, with the two conical components contained within a release sleeve. The two conical components and the release sleeve are rotationally locked by radial pins.

None of the above inventions and patents, taken either singly or in combination, is seen to describe the instant invention as claimed. Thus, a wedge clutch assembly solving the aforementioned problems is desired.

SUMMARY OF THE INVENTION

The present invention is directed to multiple embodiments of a wedge clutch assembly requiring a minimum of space for inclusion in any electric or pneumatic power tool and drilling rig to prevent damage to an electrically powered rotary or reciprocal hand drill, screwdriver, well drill, and the like tool or apparatus. The first embodiment utilizes the wedge clutch assembly on a pinion or drive shaft having a configuration sequentially as a first small diameter and a proximate threaded region, a second conical region increasing in diameter, a third increased diameter region, a fourth gear region, and a fifth decreased diameter region. A steel clutch wedge spring washer is positioned adjacent the pinion gear, and a retaining nut is threaded on the proximate threaded region for retaining the steel clutch wedge spring washer. A clutch cup is inserted on the conical enlarged region of the pinion shaft and inside the pinion gear.

A thrust bearing may be disposed on the pinion or drive shaft. The thrust bearing may be disposed either between the spring washer and the pinion gear, or between the retaining nut and the spring washer. The thrust bearing helps to take pressure off of the retaining nut.

The second embodiment utilizes a pinion gear having a throughbore with inclined sides; a cylindrical pinion shaft having a conical enlarged region proximate to a first end thereof for supporting the pinion gear and a second end having a threaded region; and a bearing spacer element, a bearing, a clutch wedge spring steel washer, and a retaining nut sequentially secured on the threaded region of the pinion shaft.

A third embodiment utilizes a driven cylindrical motor shaft; a clutch cup having a first enlarged region adapted with a keyway for passing said motor shaft therethrough; the clutch cup having a second conical reduced region and a third externally threaded neck region; a sprocket wheel frictionally fitted on the second conical reduced region of the clutch cup; a steel clutch wedge spring washer positioned adjacent the sprocket wheel; and a nut retaining the steel spring washer on the motor shaft. Further embodiments, including the addition of a housing in order to protect the wedge clutch assembly from environmental contamination, are further described.

A further embodiment is configured for installation in the propeller hub of a watercraft drive system, and serves to prevent damage to the propeller or drive due to excessive torque to the drive in the event the propeller contacts an object. This embodiment includes a protective cap at each end thereof to seal the assembly from the elements.

Accordingly, it is a principal object of the invention to provide a wedge clutch assembly for hand tools and drilling rigs.

It is another object of the invention to provide a wedge clutch assembly incorporating a clutch wedge spring washer.

It is a further object of the invention to provide a wedge clutch assembly incorporating a clutch cup.

Still another object of the invention is to provide a wedge clutch assembly adaptable to several different pinion and drive shafts.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to three embodiments of a wedge clutch assembly that can be utilized in rotatable electrically or pneumatically driven machinery, such as hand tools and drilling rigs, which would prevent expensive broken gear damage.

Figure 1:
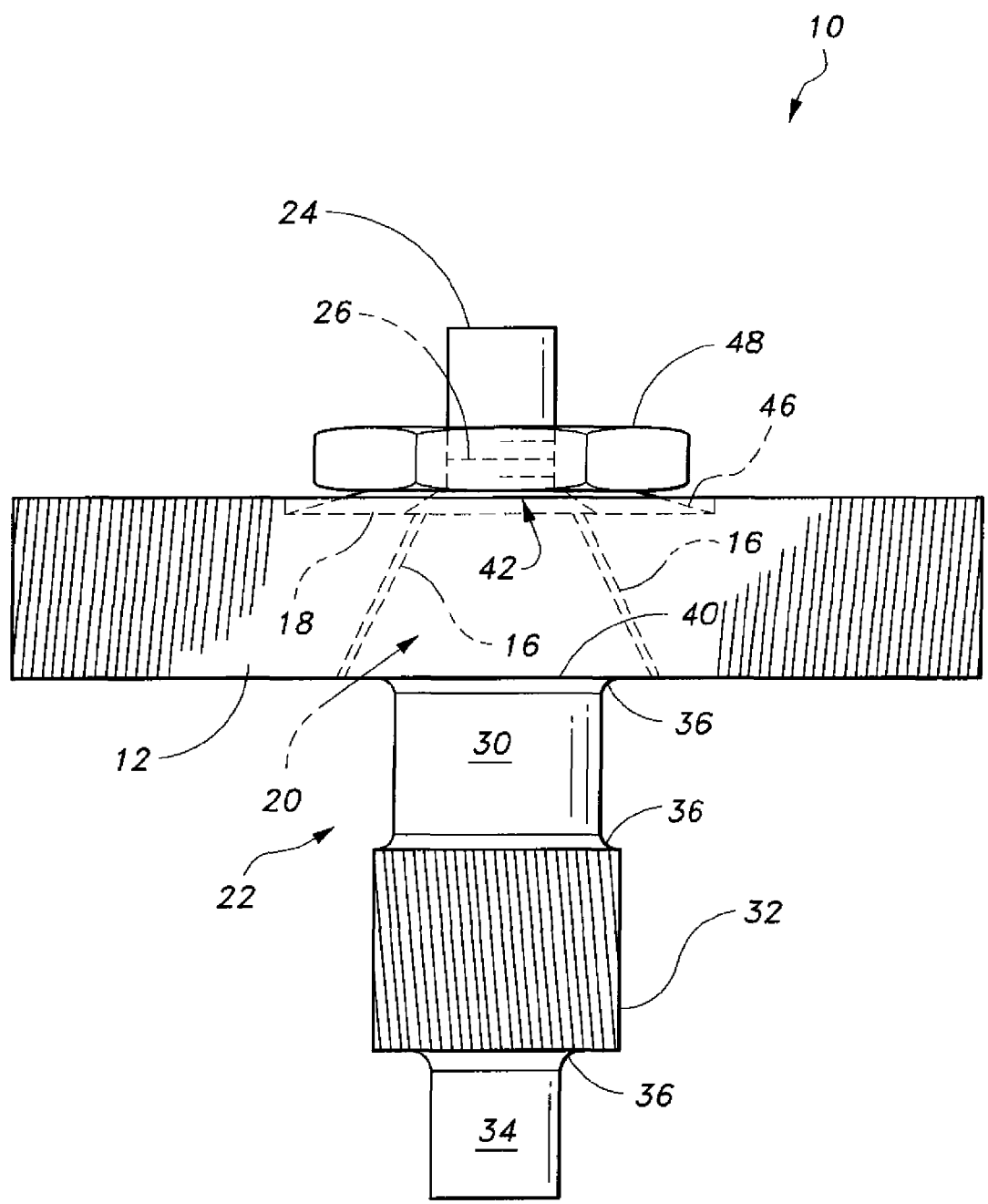
FIG. 1 is a schematic elevational view of a first embodiment of a wedge clutch assembly for installation in a hand tool or a drilling rig according to the present invention.
Figure 2:
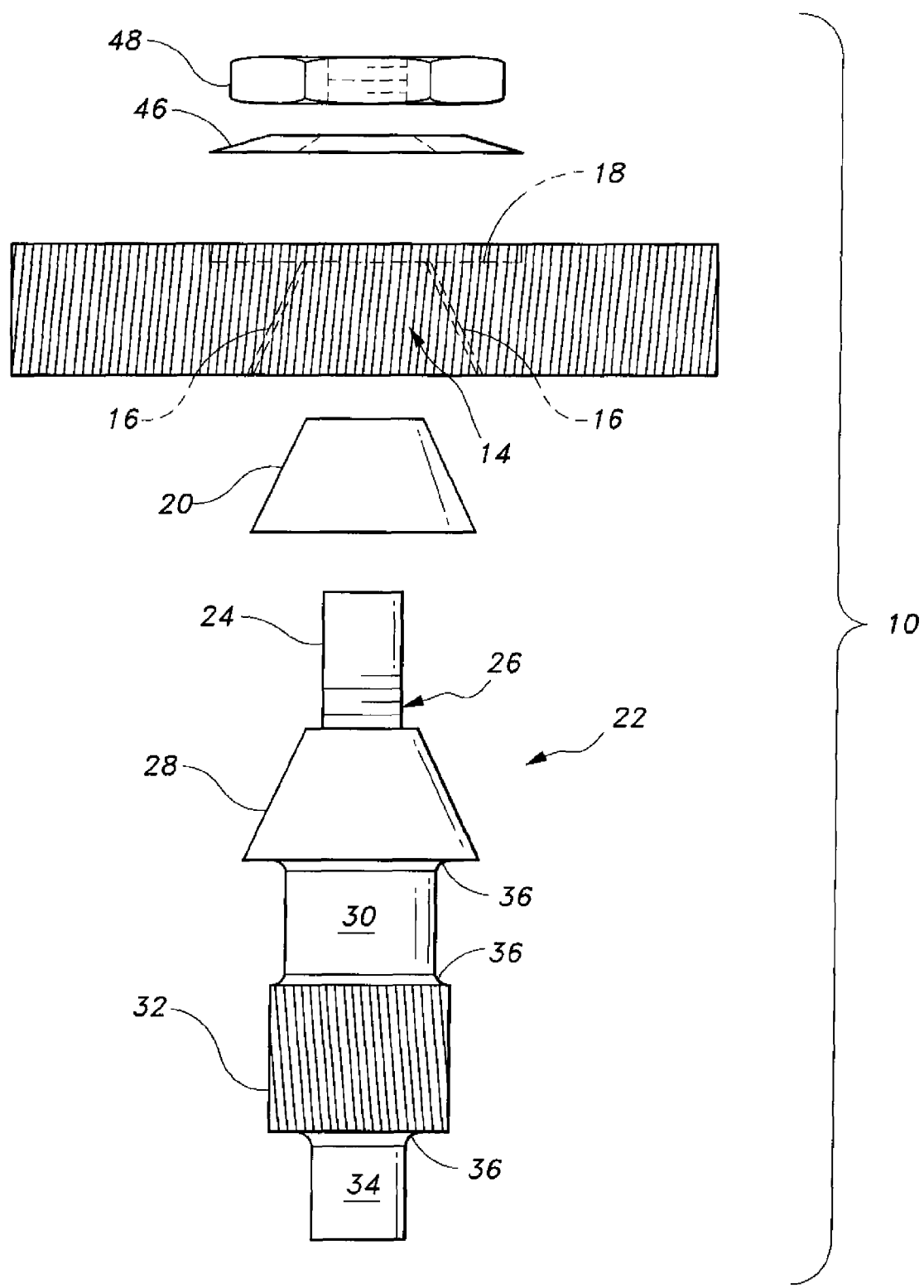
FIG. 2 is an exploded elevational view of the FIG. 1 wedge clutch assembly according to the present invention.

A first embodiment 10 of a wedge clutch assembly is illustrated in FIGS. 1 and 2. A pinion gear 12 has a throughbore 14 with inclined sides 16 to define a frustoconical configuration and a countersink 18 on its upper surface to frictionally accommodate a spring washer 46. A cylindrical pinion drive shaft 22 has in sequence from the top, a first small diameter neck 24 and a proximate threaded region 26, a second frustoconical region 28 increasing in diameter, a third increased diameter region 30, a fourth gear region 32, and a fifth decreased diameter region 34. The pinion gear 12 revolves with the pinion driven shaft 22 in order to drive a drill bit or other load. A fillet 36 is provided to support the frustoconical region 28 on one side and fillets 36 are also provided on both sides of the gear region 32.

The frustoconical bronze clutch cup 20 is 1/16 inch thick (shown also in FIG. 6) and has a wide aperture 40 and a smaller aperture 42. The bronze clutch cup 20 is inserted inside the throughbore 14 of the pinion gear 12 and fits over the frustoconical region 28 of the pinion drive shaft 22 to prevent the pinion gear 12 and the pinion drive shaft 22 from gouging or otherwise damaging the clutch wedge spring washer 46 by shear forces. The spring washer 46 is shaped as a shallow cup with open ends. The clutch wedge spring washer 46 is made of spring steel and is placed inside the countersink 18 and over the smaller aperture 42 of the clutch cup 20. A fastener, such as a retaining nut or jam nut 48, is placed on the externally threaded region 26. The jam nut 48 secures the spring washer 46 to the assembly and adjusts the sensitivity of the clutch wedge spring washer 46, or frictional force applied by the spring washer 46 to the pinion gear 12, in the countersink 18 to a specific applied torque on the drive shaft 22 of the tool, which will energize the clutching action to eliminate any damage to the mechanical drive system of the tool.

Under normal load the spring washer 46 applies sufficient frictional force against the pinion gear 12 to cause the pinion gear 12 to rotate with shaft 22 to drive the load. However, the clutch wedge spring washer 46 collapses and assumes a more flattened shape when excessive torque is applied to the main drive system by the load in order to permit the pinion gear 12 to stop and the pinion drive shaft 22 to spin freely under an excessive load. This prevents the gears from being stripped or damage to the motor when the load requires more torque than the motor can supply. This principle applies to all of the embodiments described herein.

Figure 7:
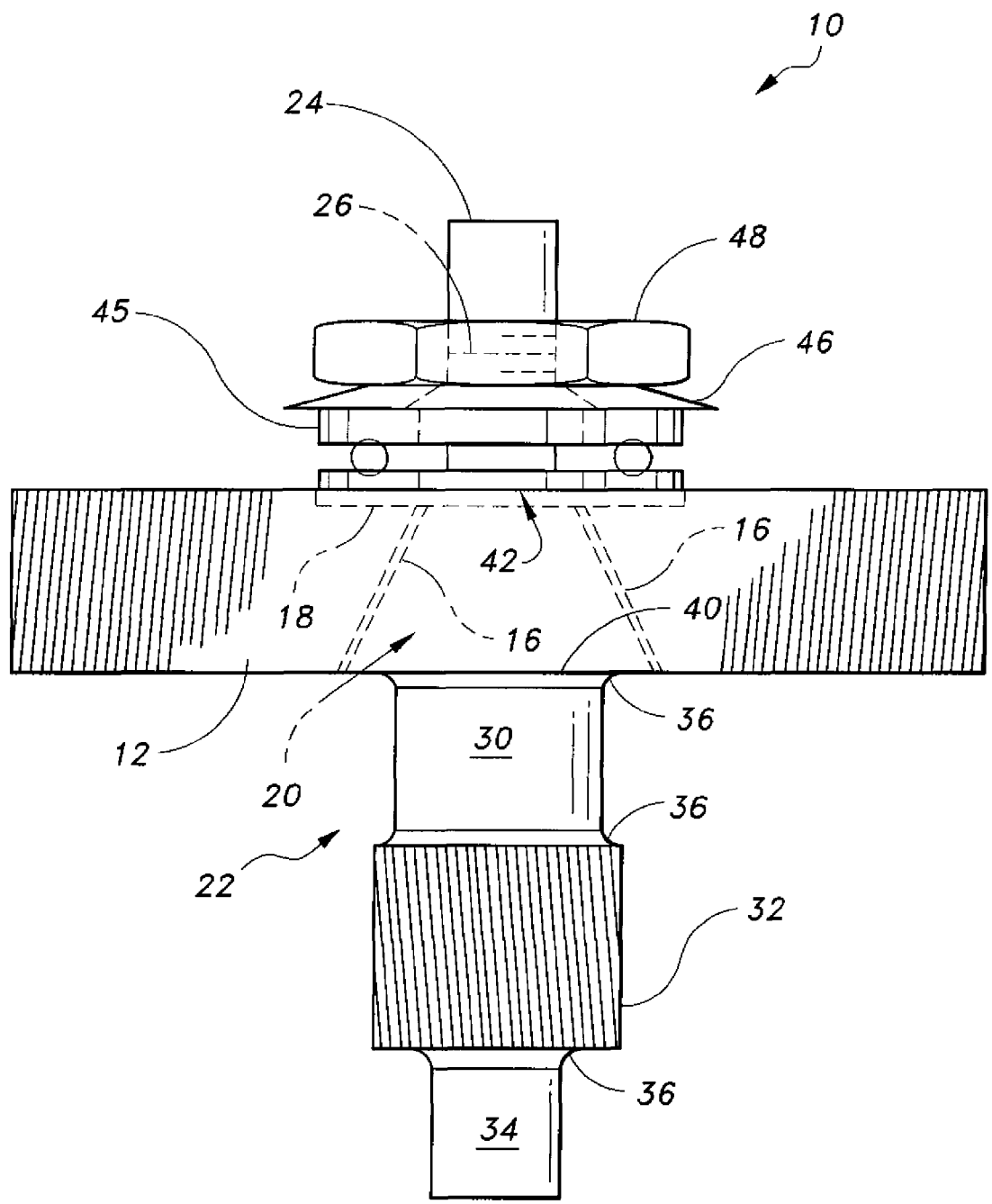
FIG. 7 is a schematic elevational view of a wedge clutch assembly according to the present invention similar to FIG. 1, but including a thrust bearing.
Figure 8:
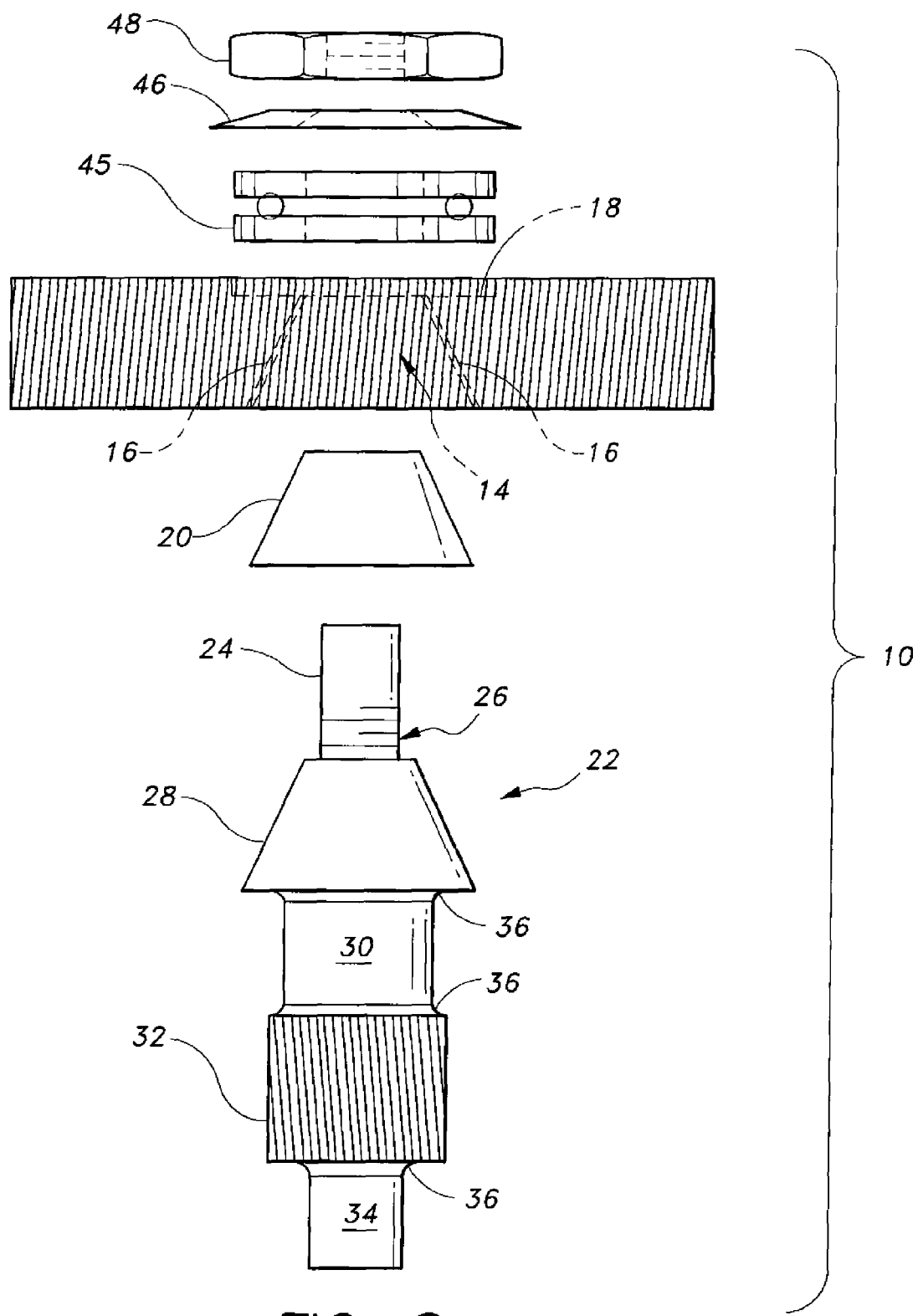
FIG. 8 is an exploded view of the clutch assembly of FIG. 7.
Figure 9:
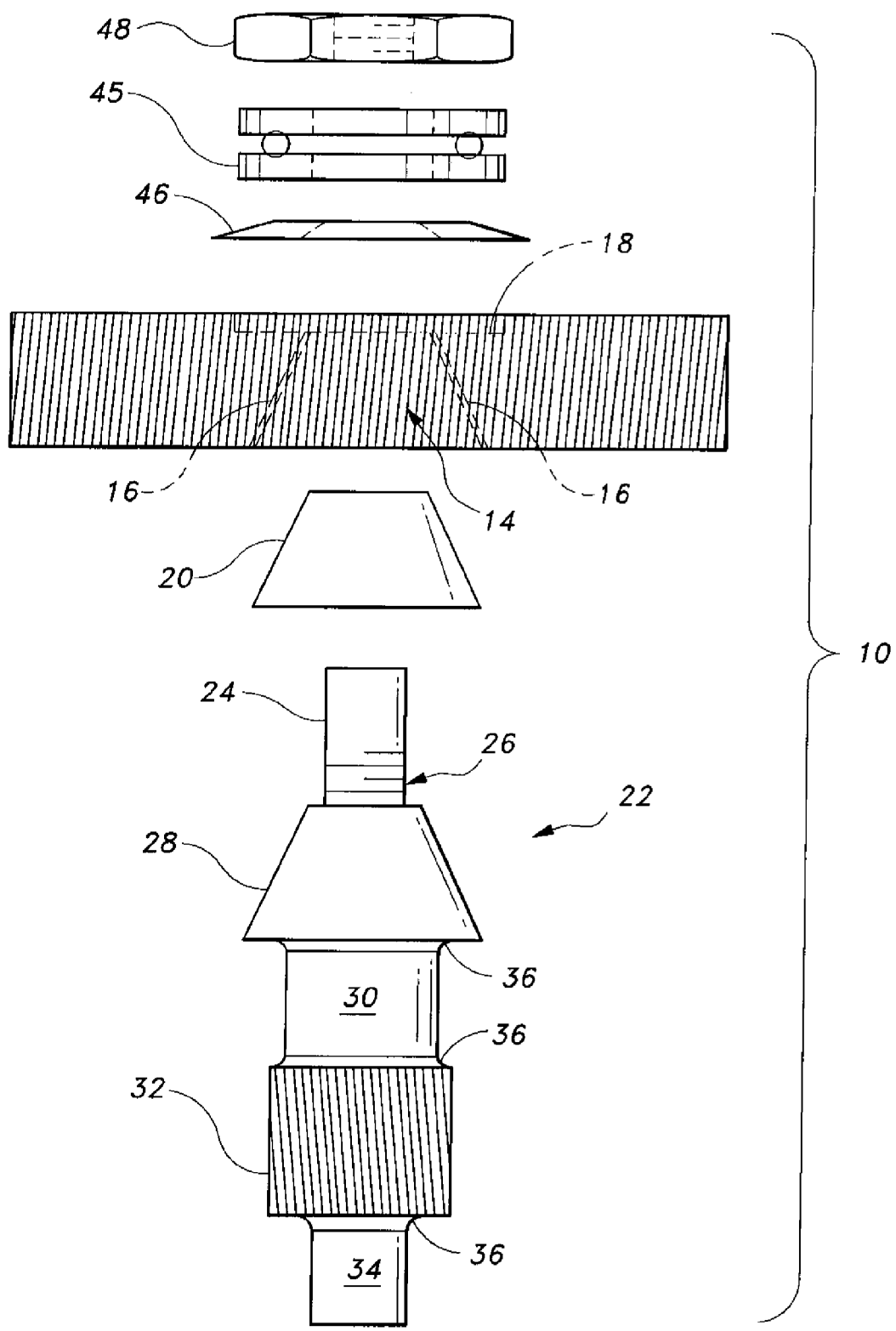
FIG. 9 is an exploded view of a wedge clutch assembly similar to FIG. 8, but with the thrust bearing disposed between the spring washer and the jam nut.

As shown in FIGS. 7-9, a thrust bearing may be disposed between the pinion gear 12 and the jam nut 48 to relieve pressure on the jam nut 48 and to prevent premature wear of the spring washer 46. In FIGS. 7 and 8, the thrust bearing 45 is disposed between the pinion gear 12 and the spring washer 46. In this configuration, under normal load the spring washer 46 exerts sufficient tension against the thrust bearing 45 to cause the bearing 45 to frictionally engage pinion gear 12, causing pinion gear 12 to rotate with shaft 22, thereby driving the load. When the load exerts excessive torque on pinion gear 12, spring washer 46 collapses and flattens, relieving the frictional force exerted by the spring washer 46 on bearing 45, thereby permitting pinion gear 12 to stop while shaft 22 rotates freely.

Alternatively, the thrust bearing 45 may be disposed between the jam nut 48 and the spring washer 46, as shown in FIG. 9. In this configuration the spring washer 46 again directly exerts frictional force against the pinion gear 12 by contact with the wall of the pinion gear 12 in countersink 18 under normal load, but collapses and flattens under excessive torque applied by the load to disengage pinion gear 12 from shaft 22 to allow free rotation of the shaft 22. Thrust bearing 45 relieves pressure against jam nut 48 and prevents excessive wear of spring washer 46.

Figure 3:
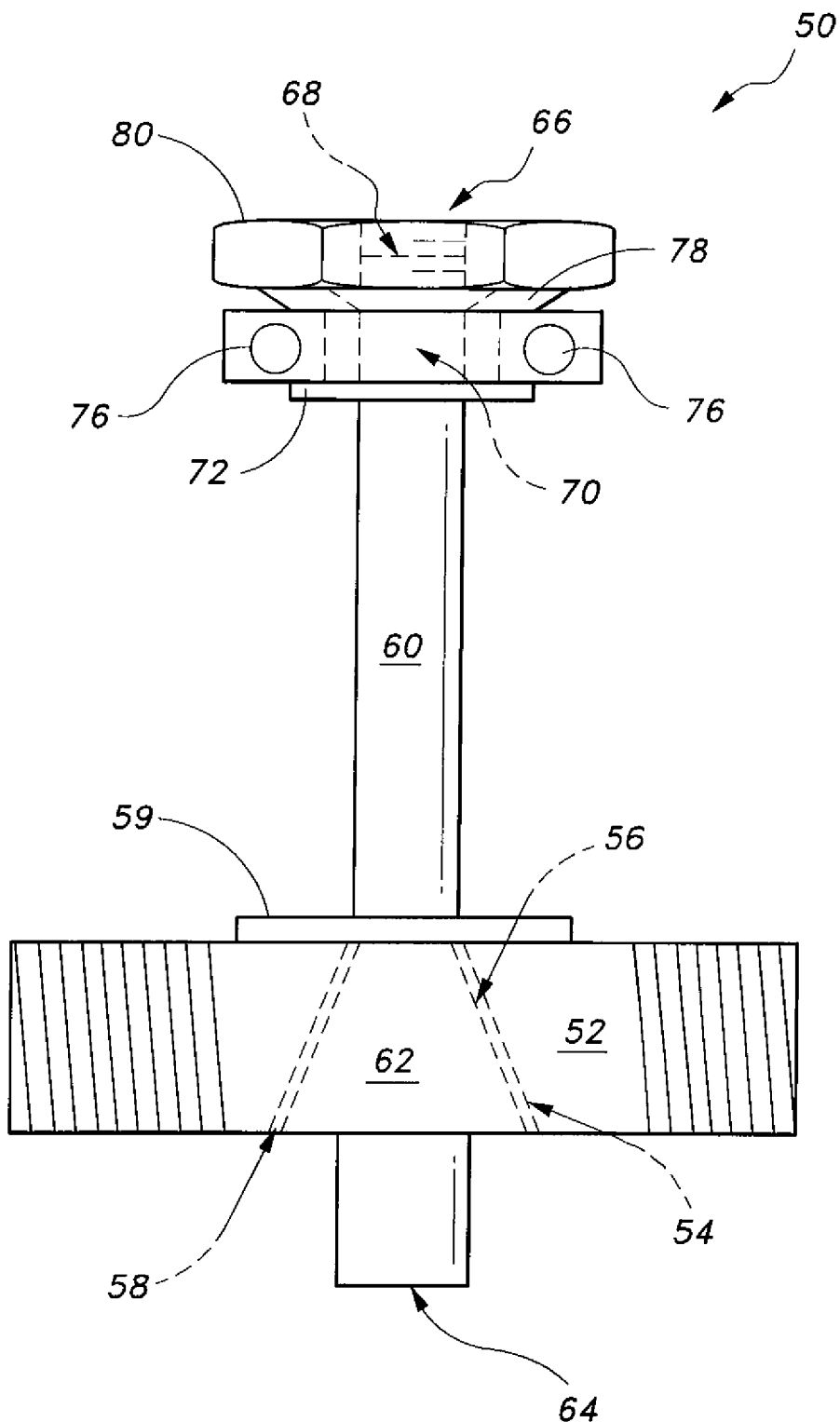
FIG. 3 is a schematic elevational view of a second embodiment of a wedge clutch assembly for installation in a hand tool or a drilling rig according to the present invention.
Figure 4:
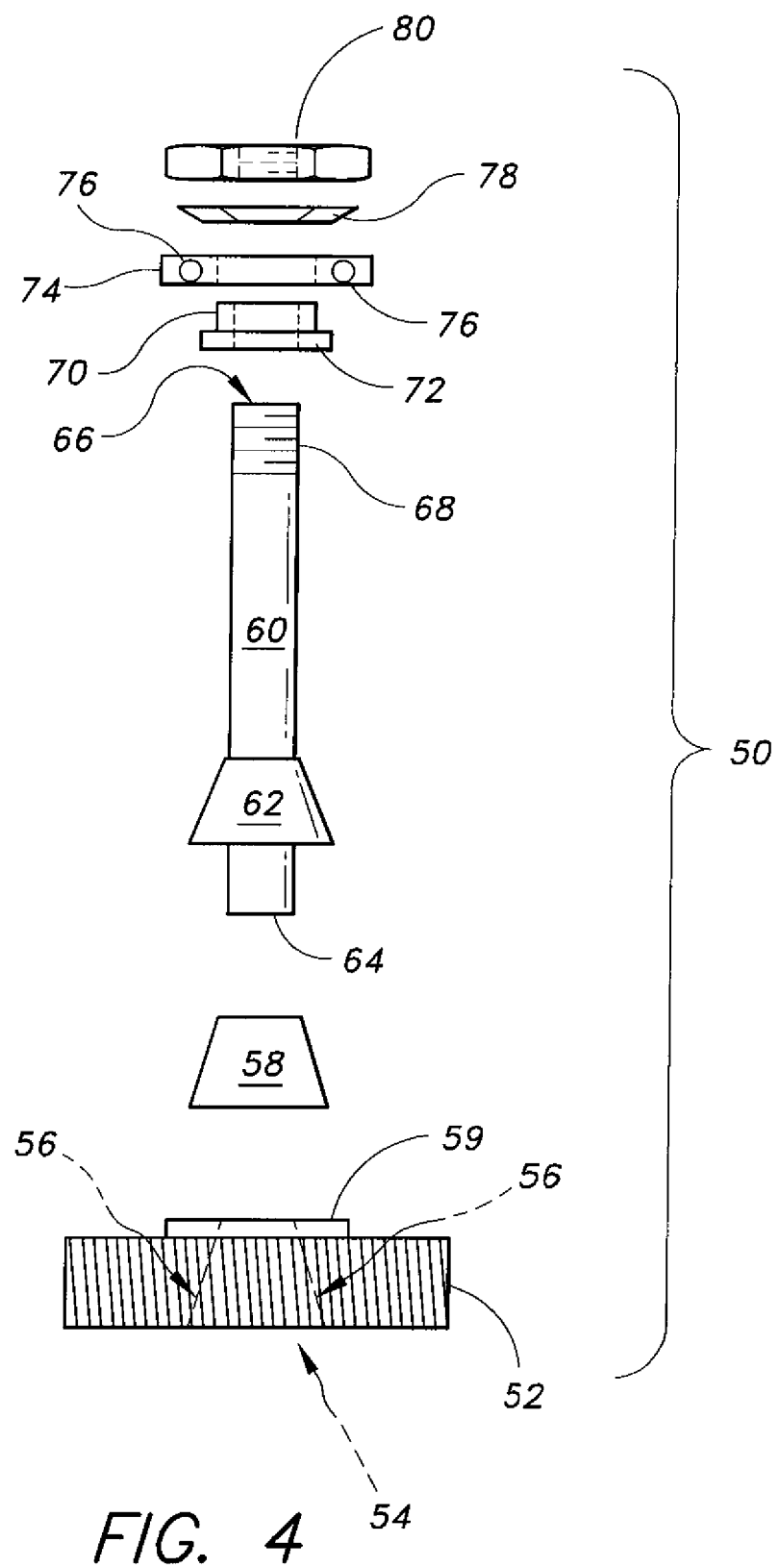
FIG. 4 is an exploded elevational view of the FIG. 3 wedge clutch assembly according to the present invention.

FIGS. 3 and 4 depict a second embodiment of a wedge clutch assembly 50 comprising a pinion gear 52 having a frustoconical throughbore 54 with inclined sides 56 for accepting a bronze clutch cup 58. The pinion gear 52 has a reinforcement ring 59 on the smaller opening of the throughbore 54. A cylindrical pinion shaft 60 has a frustoconical enlarged region 62 proximate to a first end 64 thereof for supporting the pinion gear 52 and a second end 66 having an externally threaded region 68. A bearing spacer element 70 with a shoulder 72 supports a bearing 74 with evenly spaced blind bores 76, a steel clutch wedge spring washer 78 which is inverted, and a retaining jam nut 80 sequentially secured on the threaded region 68 of the pinion shaft 60, whereby the pinion gear 52 revolves with a pinion gear of a driven shaft (not shown). Again, the sensitivity of the clutch wedge spring washer 78 is adjusted by the amount of pressure exerted by the jam nut 80. Upon excessive torque on the driven shaft due to sticking in a bore, the clutch wedge spring washer 78 will compress to disengage the pinion gear 52 from the driven gear to avoid damage to the driving system of the tool.

Figure 5:
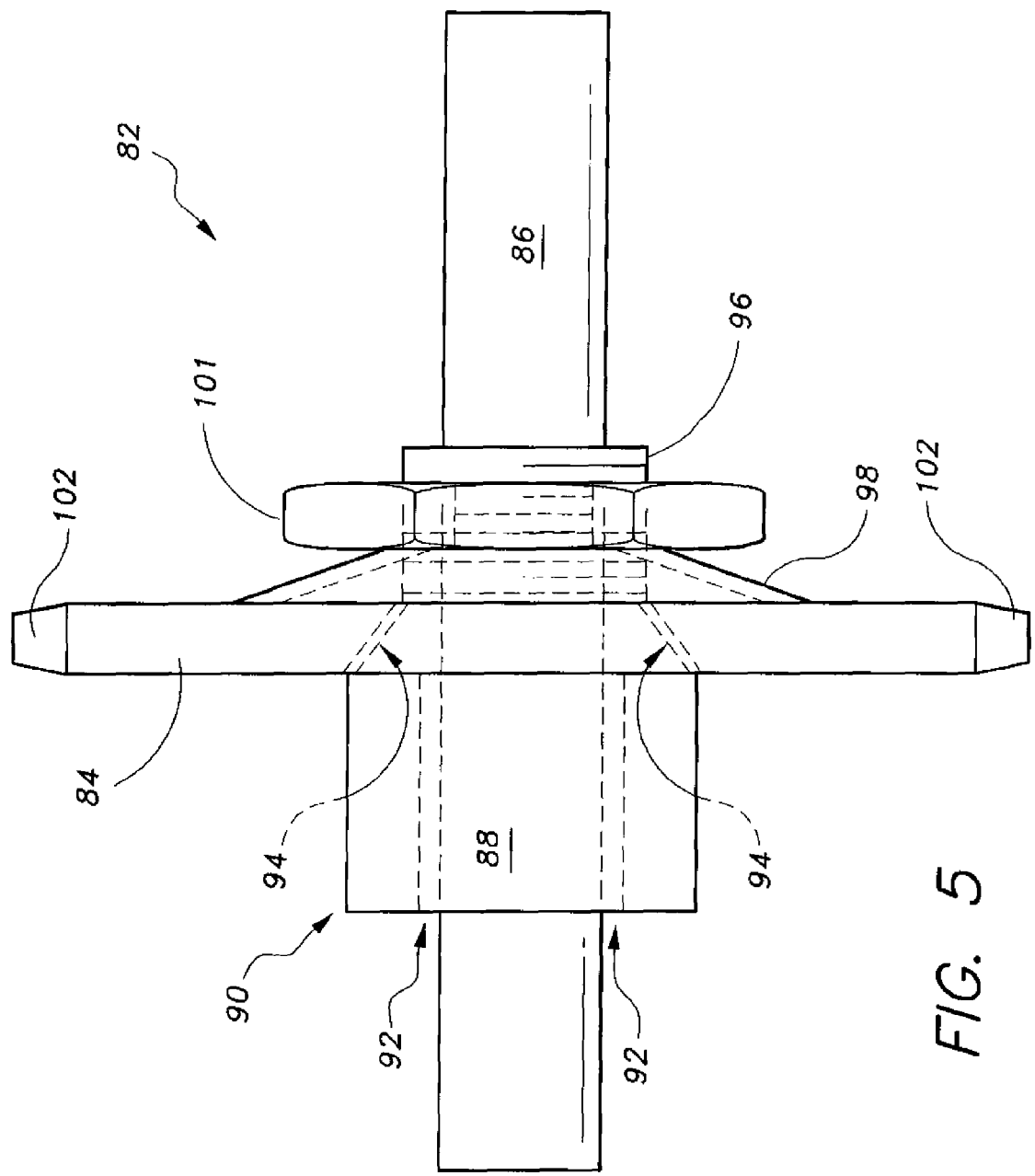
FIG. 5 is a schematic elevational view of a third embodiment of a wedge clutch assembly for installation in a hand tool or a drilling rig according to the present invention.

FIG. 5 shows a third embodiment 82 of a wedge clutch assembly for a sprocket drive wheel 84 having cogs 102 on a driven cylindrical motor shaft 86. A bronze clutch cup 88 is provided with a first enlarged region 90 adapted with a keyway 92 for passage of the motor shaft 86 therethrough. The clutch cup 88 has a second frustoconical reduced region 94 and a third externally threaded neck region 96. The driven sprocket wheel 84 is frictionally fitted on said second frustoconical reduced region 94 of the clutch cup 88. A steel clutch wedge spring washer 98 is positioned abutting the driven sprocket wheel 84, and its sensitivity is adjustably maintained by a jam nut 101 on the threaded neck region 96. Thus, the driven sprocket wheel 84 is protected from damage by the efficient operation of the steel clutch wedge spring washer 98 on the motor shaft 86.

Figure 6:
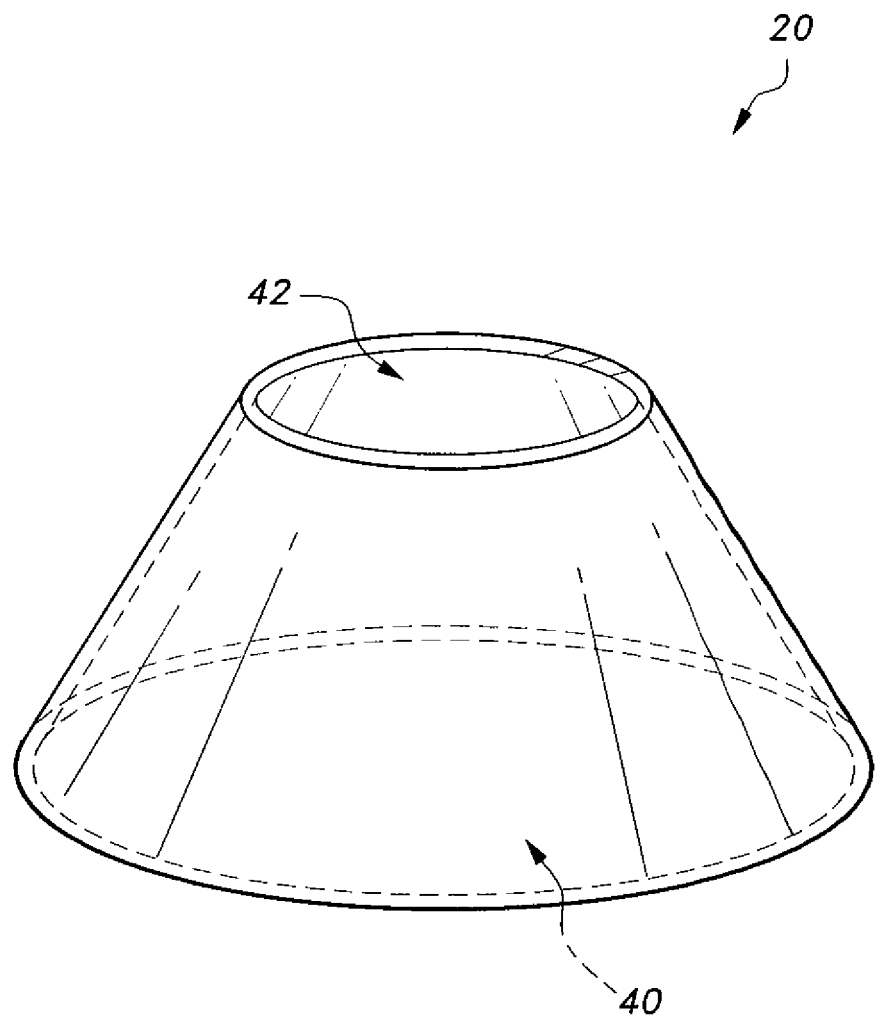
FIG. 6 is a perspective view of the FIG. 5 wedge clutch cup according to the present invention.

FIG. 6 illustrates a bronze clutch cup 20 used in the first two embodiments having a wide lower aperture 40 and a narrow upper aperture 42 to define a frustoconical configuration. The clutch cup preferably has a peripheral thickness between 1/16 of an inch and 3 inches. As noted above, clutch cup 20 is the only element in the wedge clutch assemblies made of bronze, the remaining elements being made of hardened steel.

It should be noted that it may be desirable, in the alternative, to remove clutch cup 20 from the wedge clutch assembly. By forming frustoconical region 16 and frustoconical section 28 from relatively soft materials, clutch cup 20 may be removed from system 10 without affecting operation of the clutch assembly. Such a configuration may be desirable in that friction between the moving parts will be decreased, and the chances for misalignment between the frustoconical pieces are minimized.

Figure 10:
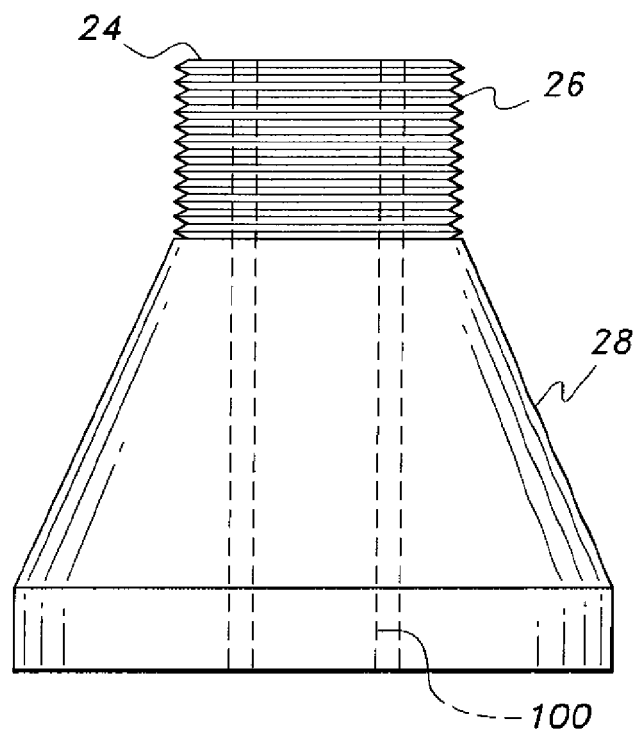
FIG. 10 is a side view of a frustoconical section of an alternative embodiment of the wedge clutch assembly according to the present invention.
Figure 11:
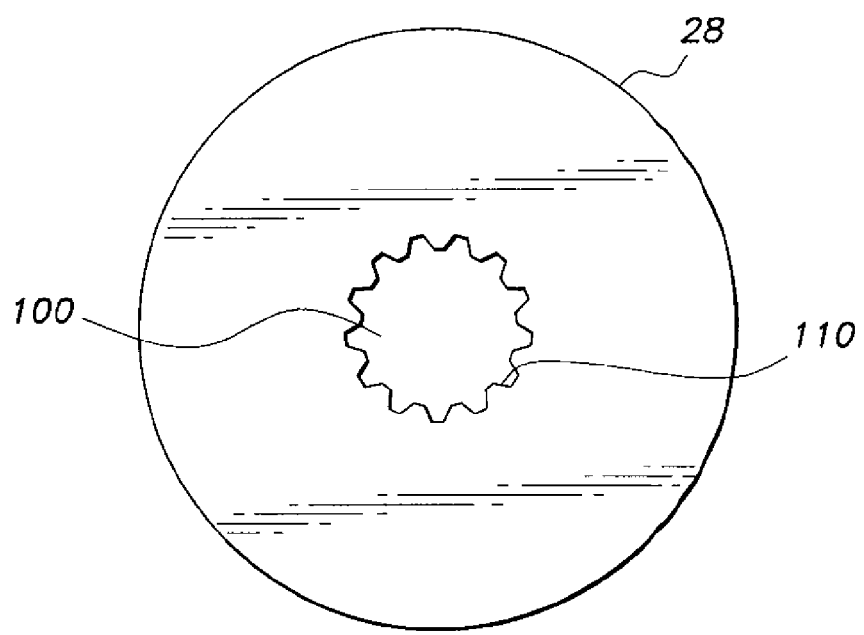
FIG. 11 is a top view of the frustoconical section of the wedge clutch assembly of FIG. 10.
Figure 12:
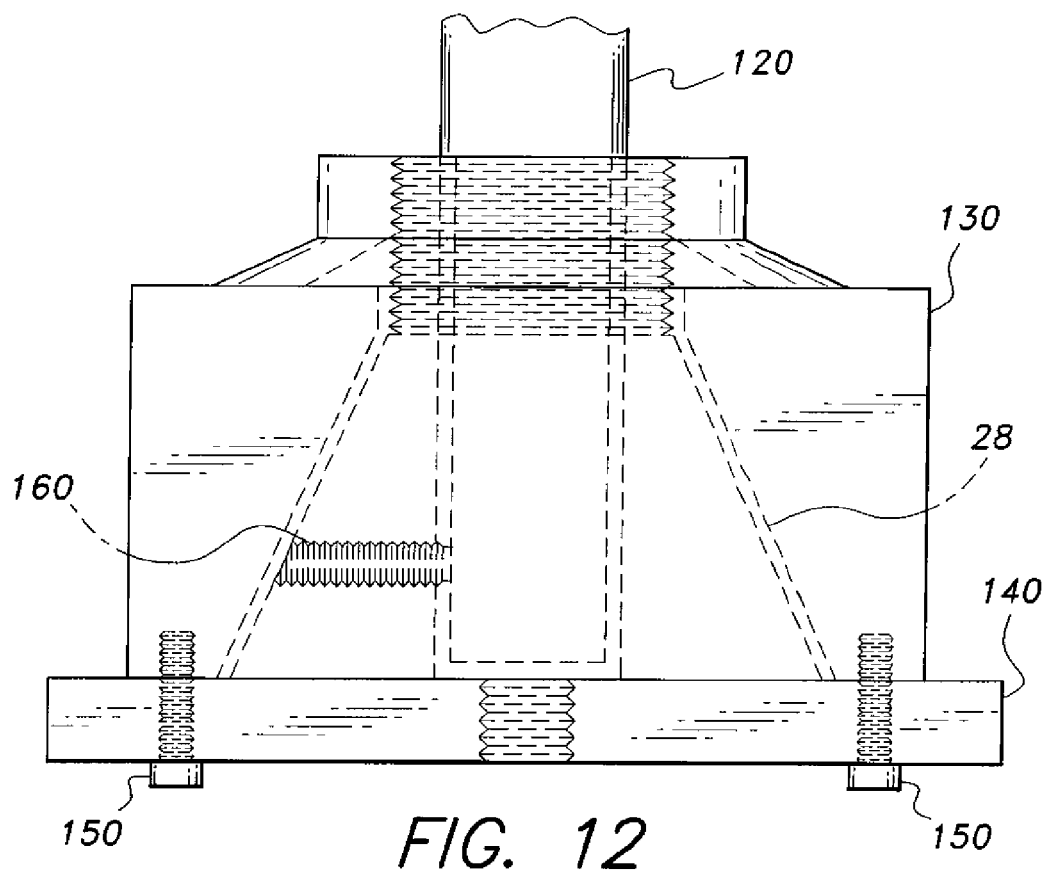
FIG. 12 is a partial side cut-away view of another alternative embodiment of the wedge clutch assembly according to the present invention.

In the alternative embodiments illustrated in FIGS. 10, 11 and 12, the frustoconical section 28 and upper externally threaded neck 24 are formed as a unitary structure having a channel 100 formed axially therethrough. Channel 100 receives a central shaft 120, which drives rotation of the wedge clutch assembly. As best shown in the top view of FIG. 11, channel 100 is patterned to include a plurality of axially extending projections, forming an engaging inner wall surface 110. In FIG. 12, central shaft 120 has a substantially cylindrical contour, however, depending on the needs of the user, shaft 120 could be contoured to include corresponding axially extending projections, forming an engaging outer wall surface for inner wall surface 110 of FIG. 11. Engagement of the extending projections of inner wall surface 110 with those of the outer wall surface of the shaft 120 releasably locks shaft 120 to frustoconical section 28 and neck portion 24. This releasable locking of shaft 120 aids in driving rotation of the frustoconical section 28 and wedge clutch assembly 10 when shaft 120 is driven by an external motive force.

Further, in the embodiment illustrated in FIG. 12, a housing 130 is provided for covering the upper externally threaded neck portion 24 and the frustoconical section 28. Clutch assemblies are typically used in combination with some sort of motor, engine or other rotary machine. Thus, clutch assemblies are often exposed to dirt and other contaminants and pollutants, which can clog the moving parts of the clutch assembly. The embodiment illustrated in FIG. 12 is well adapted for usage with lawn mower blades and the like. Cover 130 is provided to prevent clogging and contamination of the rotary section of the clutch assembly 10, when used in combination with a rotary drive system. A removable lid 140 is provided to allow the user selective access to the interior of housing 130 for repair or replacement of parts. Removable lid 140 is secured to housing 130 through a plurality of releasable fasteners, such as screws or bolts 150, as shown.

Figure 13:
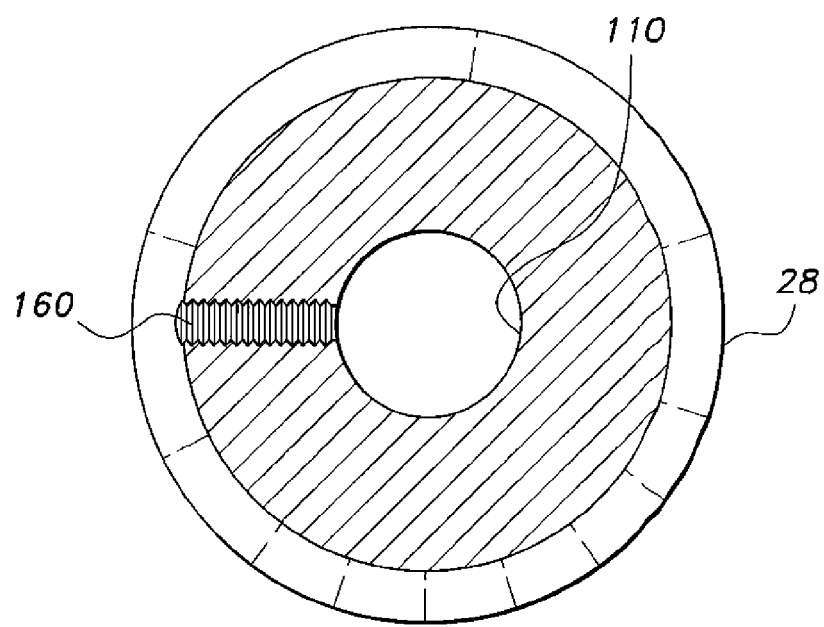
FIG. 13 is a top view of a frustoconical section of the wedge clutch assembly of FIG. 12.

Additionally, a threaded bore hole 160 may be formed through frustoconical section 28, extending radially therethrough from the outer surface of frustoconical section 28 to channel 100, as best shown in the top cut-away view of FIG. 13. The user may insert a threaded engaging member, such as a screw or a bolt, for selective locking engagement with central shaft 120, thus securing shaft 120 to the frustoconical section 28 and upper neck portion 24. This additional locking engagement may be used with a smooth or keyed shaft, such as that shown in FIG. 12, a patterned shaft as would be necessary for the embodiment of FIG. 11, or may be used with a shaft contoured dependent upon the needs and the desires of the user. Additionally, as further shown in FIG. 12, housing 130 may be contoured to include threads or the like for securely receiving and holding the threads 26 of threaded neck portion 24.

Figure 14:
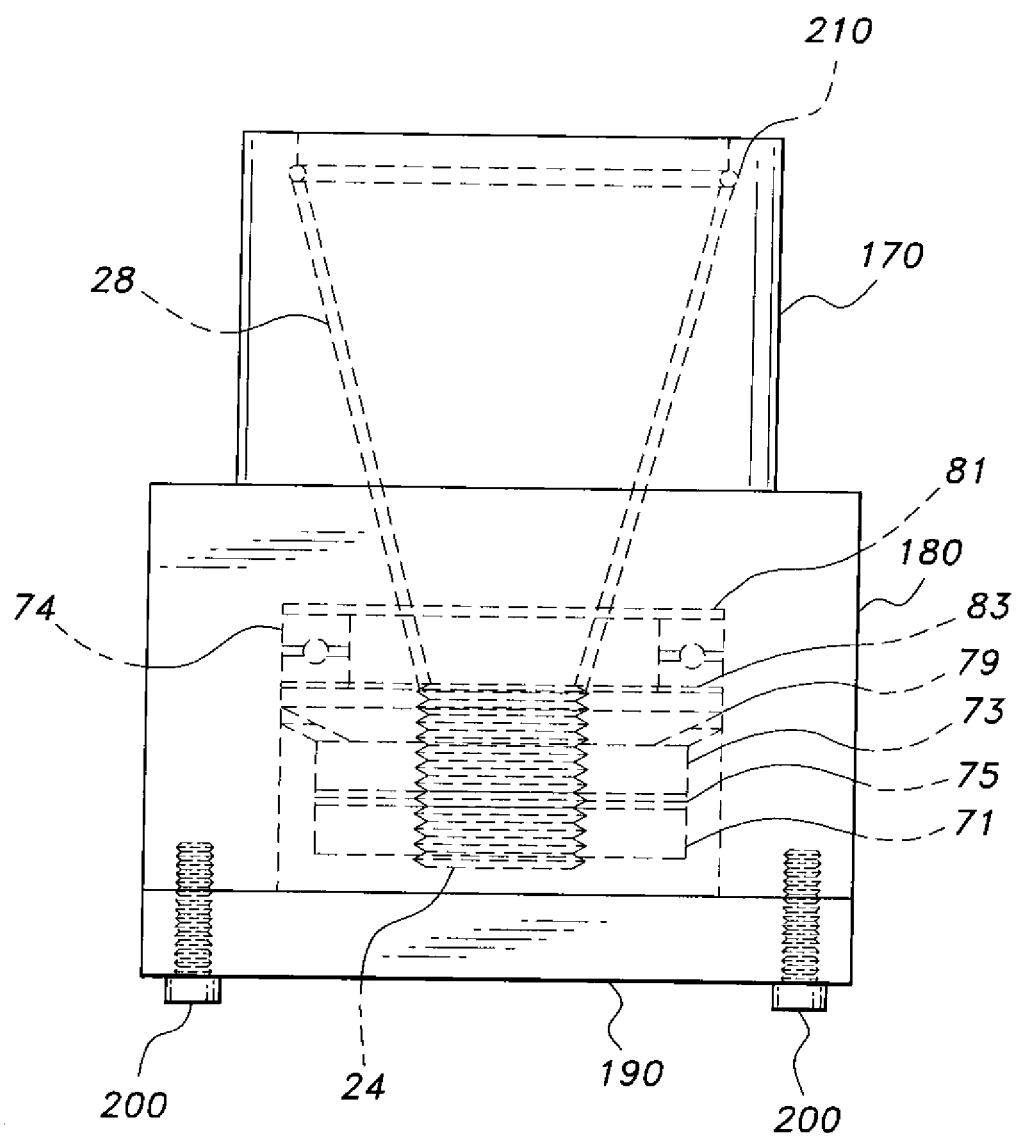
FIG. 14 is a partial side cut-away view of yet another alternative embodiment of the wedge clutch assembly according to the present invention, illustrating the frustoconical section housed within a protective housing.

In the alternative embodiment shown in FIG. 14, the upper portion (in the configuration as shown) of frustoconical section 28 is housed within a first housing 170. First housing 170 includes an open upper end and an open lower end. A gasket or O-ring 210 is received within the open upper end of first housing 170, preventing contamination from dirt and other contaminants where the remainder of cylindrical pinion shaft 22 projects outwardly therefrom. The embodiment of FIG. 14 is well adapted for usage with the drive lines of heavy duty vehicles and the like.

The open lower end of first housing 170 is in communication with a second housing 180, which receives the remainder of frustoconical section 28 and the threaded neck portion 24. The lower end of second housing 180 is open and is covered with a releasable lid 190. Similar to that shown in FIG. 12, lid 190 is releasably held to housing 180 by a plurality of fasteners 200, which may be bolts, screws or the like. Lid 190 seals the internal parts from external contaminants, and further allows the system to be bolted to one side of the driveline. Further, as shown, a washer 75 is sandwiched between a jam nut 71 and an adjustment nut 73. These are received about the threaded portion 24, as shown. Further, a pair of Belleville springs or disc springs 79 are sandwiched between adjustment nut 73, and a thrust washer 83. Thrust bearing 74 is sandwiched between the lower thrust washer 83 and an upper thrust washer 81, as shown.

Figure 16:
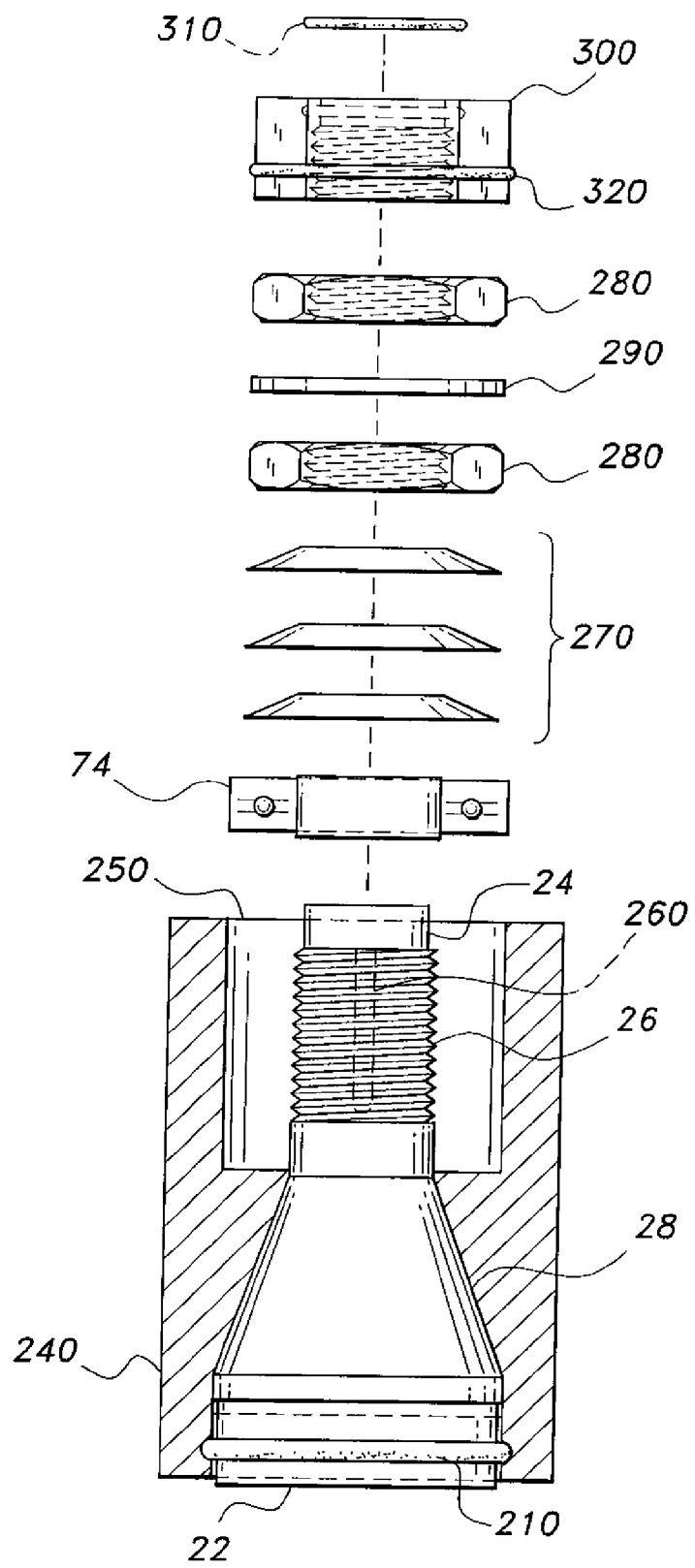
FIG. 16 is an exploded partial side cut-away view of yet another alternative embodiment of the wedge clutch assembly according to the present invention.

In the similar embodiment shown in FIG. 16, a single housing 240 is provided for receiving and covering frustoconical section 28 and threaded neck portion 24. The remainder of pinion shaft 22 projects downwardly and outwardly from the lower end of housing 240, and a gasket or O-ring 210 is provided for sealing the open lower end of housing 240 about the shaft. The embodiment of FIG. 16 is well adapted for use with marine-type vehicles and the like.

The open upper end 250 is adapted, dimensioned and configured to receive thrust bearing 74, a pair of fasteners, such as nuts 280, a washer 290 sandwiched between the fasteners 280, and a locking fastener 300. Washer 290 may be a locking-type washer for preventing further movement of jam nuts 280. Particularly, washer 290 may be a keyed locking-type washer. Additionally, at least one resilient element, such as a disc spring, 270, is provided, as shown. Although shown as a stack of three disc springs, it should be understood that the number of resilient elements and the type of resilient elements may vary.

Each of the fasteners 280 and 300 has a threaded passage formed centrally therethrough for engaging threads 26 of neck portion 24. Additionally, a second gasket or O-ring 310 may be provided within the passage formed through fastener 300 for forming a seal against contamination with neck portion 24. Additionally, a third gasket or O-ring 320 may be provided around the external surface of fastener 300 in order to form a seal with the inner wall of housing 240, which defines opening 250.

Further, a vertical channel 260 may be formed in the external surface of threaded neck portion 24, as shown in FIG. 16. The user may engage vertical channel 260 with an engaging element, such as a bolt or a screw, in order to selectively and releasably lock threaded neck portion 24 to housing 240.

Figure 15:
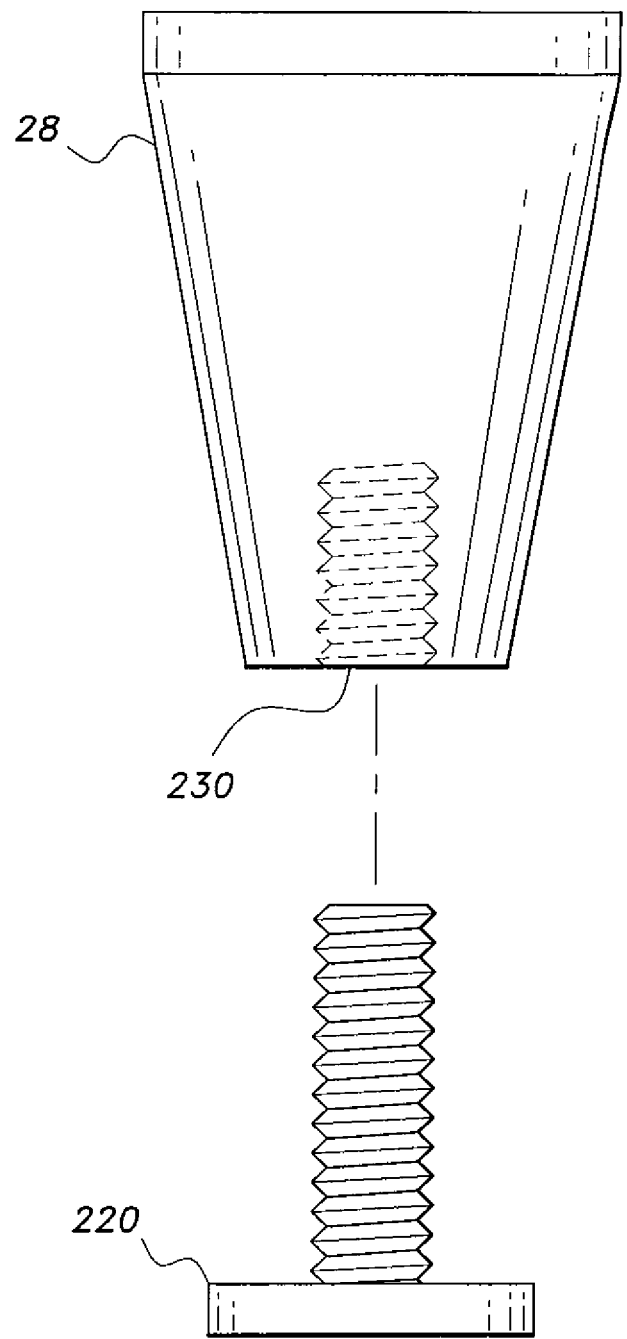
FIG. 15 is a side attachment view of a frustoconical section and a corresponding sealing bolt according to yet another embodiment of the wedge clutch assembly according to the present invention.

Additionally, under certain conditions, such as in environments where a great quantity of pollutants might enter the clutch assembly 10, it may be necessary to seal off the interior of frustoconical section 28. As shown in FIG. 15, frustoconical section 28 may have an internal bore passage 230 formed through the upper end thereof. A threaded sealing element, such as bolt 220, is provided for selective and releasable engagement with passage 230 to seal the upper open portion of the frustoconical section 28 from contamination.

Figure 17:
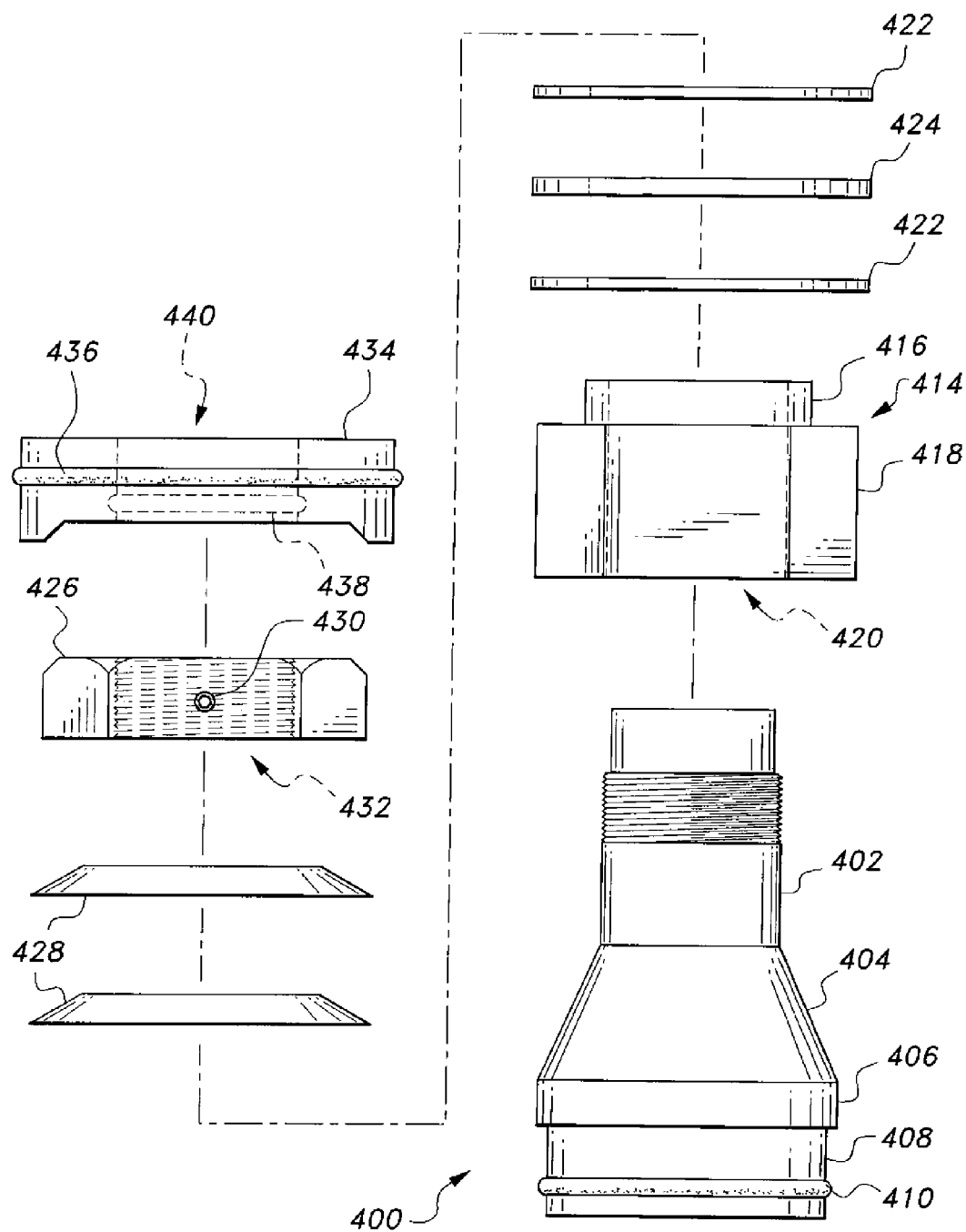
FIG. 17 is an exploded side view of yet another alternative embodiment of a wedge clutch assembly according to the present invention.

The alternative embodiment illustrated in FIG. 17 is similar to that of FIG. 16, in that the clutch cup of previous embodiments is replaced by an inner wedge or pinion shaft 400, which includes an upper, threaded neck portion 402, a frustoconical section 404 adjacent the threaded neck portion 402, and an increased diameter section 406, which is formed on a lower end of frustoconical section 404 and extends downwardly therefrom. As in the previous embodiments, the upper threaded neck portion 402 includes a central threaded portion, and smooth, or non-threaded, upper and lower portions disposed above and below the threaded portion. The increased diameter section 406, as shown, has a diameter greater than that of the threaded neck portion 402.

Figure 18:
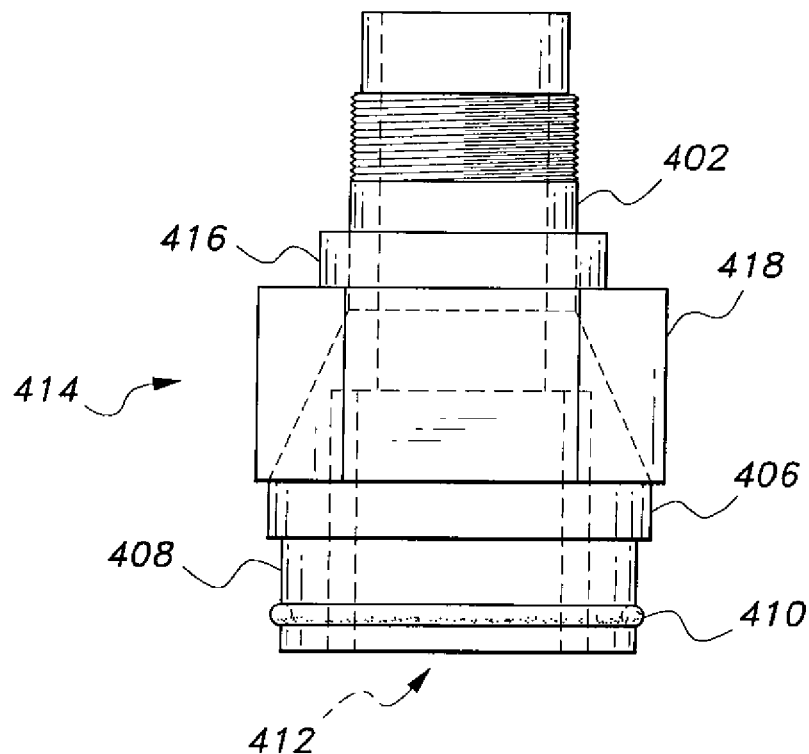
FIG. 18 is a partially assembled side view of the wedge clutch assembly of FIG. 17.

A lower section 408 is formed adjacent a lower end of the increased diameter section 406, as shown, the lower section 408 preferably having a diameter less than the diameter of the increased diameter section 406, but greater than the diameter of the threaded neck portion 402. A gasket or O-ring 410 is mounted annularly about the lower section 408. The pinion shaft or inner wedge 400 is preferably formed from a relatively soft material, such as bronze, allowing for the elimination of the bronze clutch cup of previous embodiments. As shown in FIG. 18, a central passage 412 (shown in phantom) is formed through the inner wedge 400, allowing the inner wedge 400 to be mounted on one side of the driveline or drive shaft 448.

Figure 19:
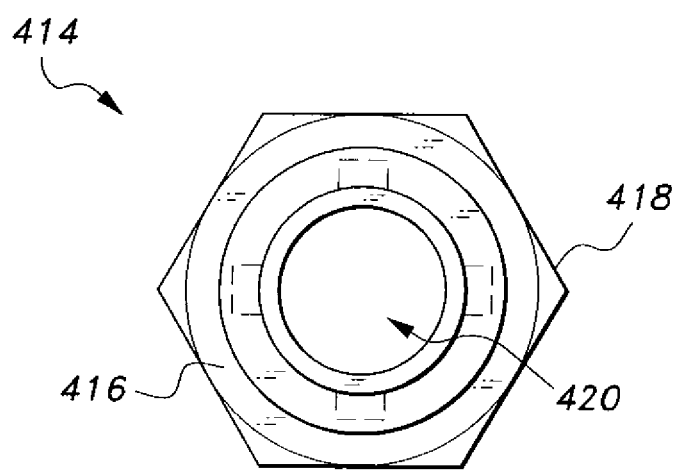
FIG. 19 is a top view of an outer wedge of the wedge clutch assembly of FIG. 17.
Figure 20:
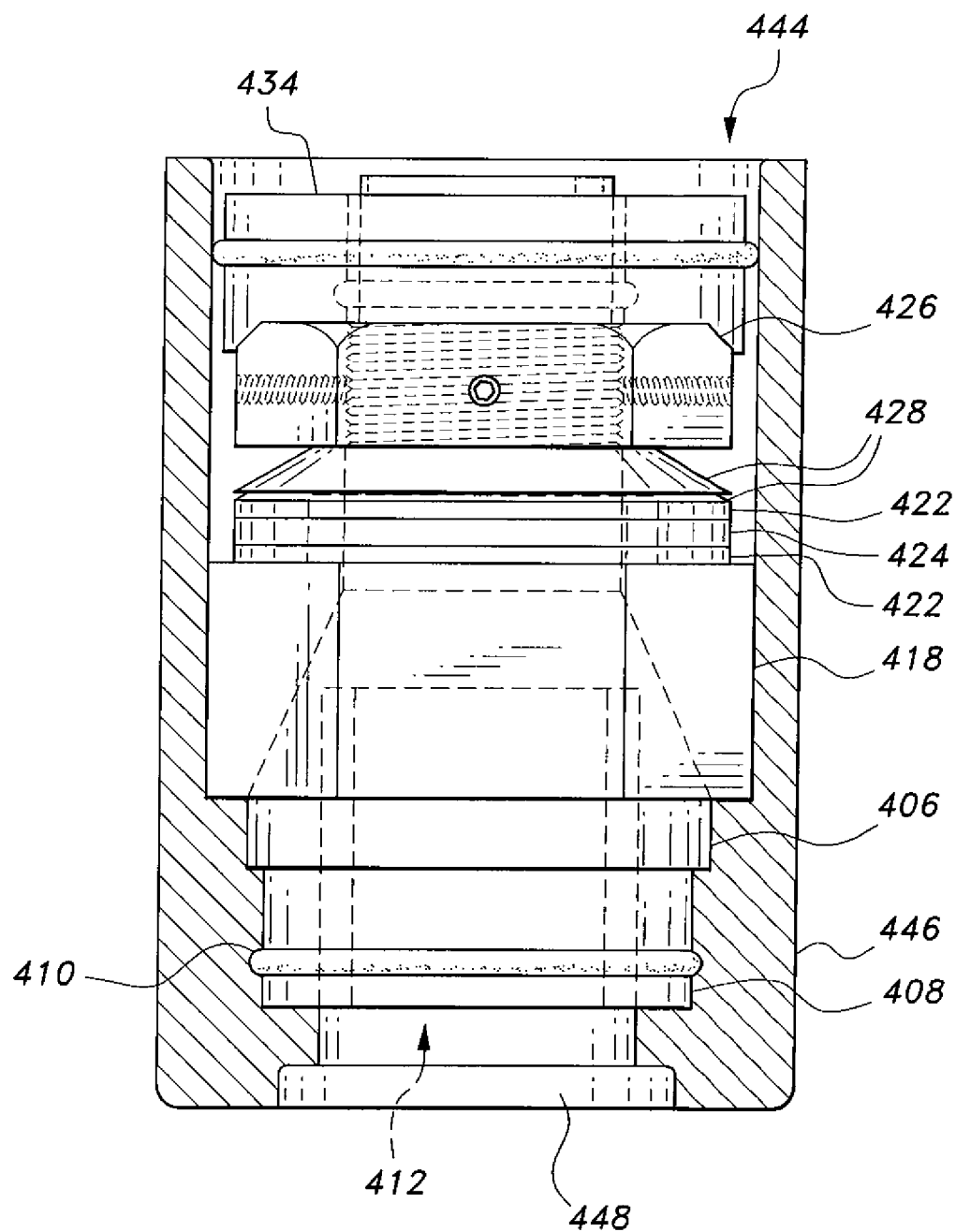
FIG. 20 is a side view in section of the wedge clutch assembly of FIG. 17.

An outer wedge or housing 414 is further provided, the housing 414 having an upper portion 416, a lower portion 418, and a central passage 420 formed therethrough for receiving the inner wedge 400 (as best shown in FIG. 18). The upper portion 416 is mounted about the lower end of threaded portion 402, and the lower portion 418 of the outer wedge housing 414 covers the frustoconical section 404. As shown in FIG. 18, the increased diameter portion 406 and the lower portion 408 project outwardly from the lower end of the housing 414. As shown in FIG. 19, the housing 414 preferably is substantially hexagonal. As in the previous embodiments, the inner wedge 400 preferably is substantially circular when viewed from above, including the threaded section 402, the frustoconical portion 404, the increased diameter portion 406, and the lower section 408. Similarly, the ancillary elements, such as the washers and thrust bearing, all have circular cross-sectional contours, and only the outer wedge or housing 414 has a hexagonal contour. The outer wedge 414 is preferably formed from relatively hard stainless steel or the like, and the hexagonal shape allows the outer wedge 414 to fit within a cavity of the other side of the driveline. When the clutch slips, the outer wedge 414 will begin to spin only when sufficient torque is applied thereto. FIG. 20 illustrates the assembled housing and pinion shaft (and associated components, described in detail below) seated within a cavity 444 of the driveline 446 of the clutch.

A thrust bearing 424 (similar to thrust bearing 74 of FIG. 16) is sandwiched between a pair of thrust washers 422, as shown, and the bearing 424 and the washers 422 are mounted about the upper portion 416 of the outer wedge housing 414 and the neck portion 402. The thrust bearing 424 aids in preventing locknut 426 from loosening and provides enhanced release on the clutch. A pair of spring washers or disc springs 428, such as Belleville spring washers, are mounted on top of the upper thrust washer 422 (similar to disc springs 270 of FIG. 16), and are also disposed about the neck portion 402. The spring washers 428 provide spring-biasing between the inner wedge 400 and the outer wedge 414. The locknut 426 is mounted on top of the spring washers 428, and is secured to the threads on the neck portion 402 by an internally threaded bore 432 formed centrally therethrough. The locknut 426 allows for adjustment in pressure between the spring washers 428, the thrust bearing 424, the inner wedge 400 and the outer wedge 414. A setscrew 430 is mounted in the locknut 426, allowing the locknut 426 to be further fastened to the threaded neck portion 402.

A seal flange 434 is mounted above the locknut 426, and includes an outer gasket 436, and an inner gasket 438 mounted about an inner passage 440 (similar to outer gasket 320 and inner gasket 310 of FIG. 16). As shown in FIG. 20, the lower gasket 410 acts to seal the lower portion, and the upper gaskets 436, 438 act to seal the upper portion, thus preventing contaminants from entering the driveline cavity 444 in the clutch and interfering with operation of the internal components. The seal flange 434 is preferably formed from plastic.

Figure 21:
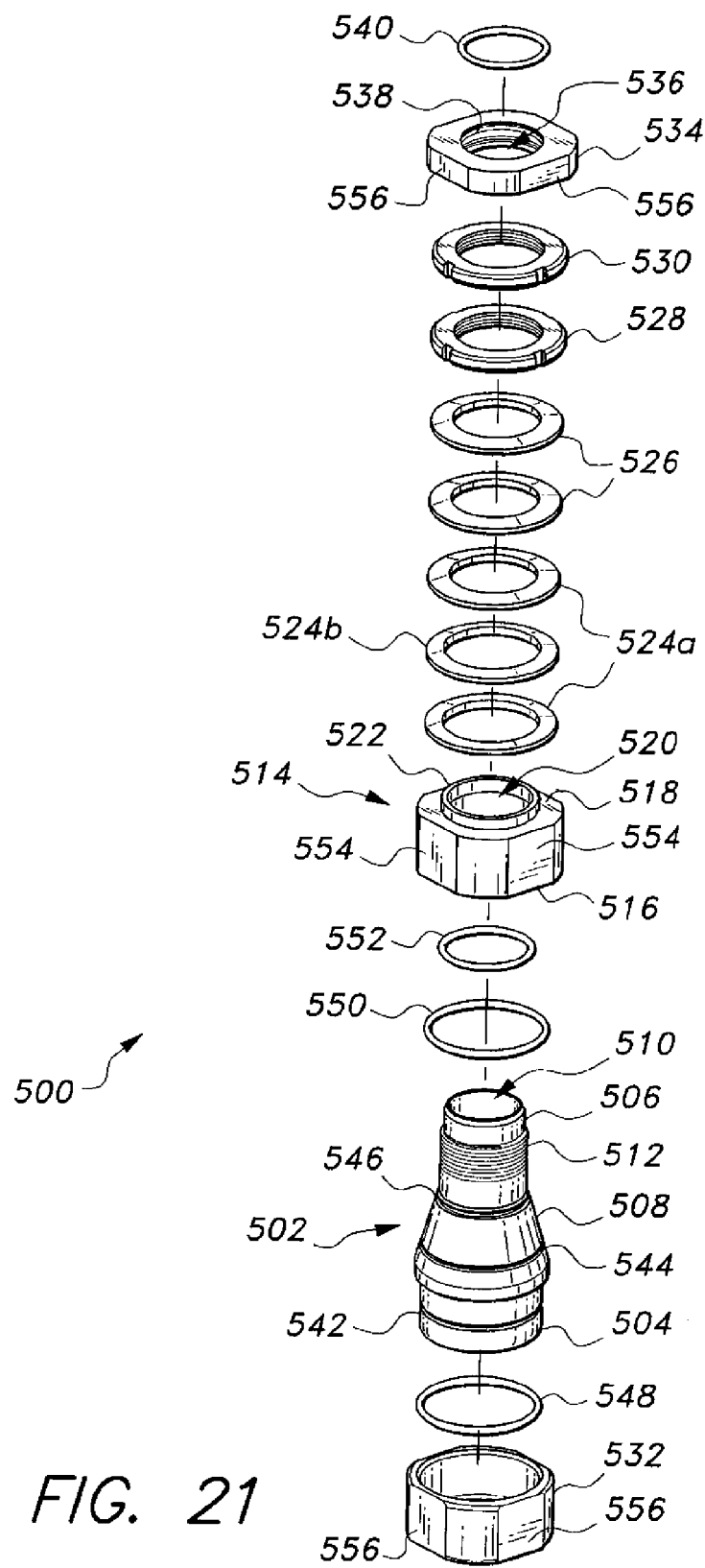
FIG. 21 is an exploded perspective view of another alternative embodiment of a wedge clutch assembly according to the present invention, configured for installation in the propeller hub of a boat or other watercraft.

FIG. 21 of the drawings is an exploded perspective view of another embodiment of the wedge clutch assembly, designated as wedge clutch assembly 500. The alternative embodiment 500 illustrated in FIG. 21 is similar to that of FIGS. 17 through 20, in that the clutch cup of previous embodiments is replaced by an inner wedge, pinion shaft or torque body 502 having a large diameter, cylindrical first end portion 504 and an opposite smaller diameter second end portion 506, the two end portions 504, 506 defining a medial frustoconical portion 508 therebetween. The torque body 502 defines a concentric passage 510 extending completely therethrough from the first end portion 504 to the second end portion 506 for the installation of the assembly 500 on a drive shaft or other shaft member (not shown). The smaller diameter second end portion 506 includes an externally threaded area 512 disposed therearound. The threaded area 512 need not extend along the entire length of the smaller diameter second end portion 506, but may be formed about the medial portion of the second end portion 506, as shown in FIG. 21.

A slip member 514 fits over the conical portion 508 of the torque body 502. The slip member 514 has a first end 516, an opposite second end 518, and a frustoconical internal passage 520 extending completely therethrough. The frustoconical shape of the passage 520 is not shown in FIG. 21, but is substantially the same shape as that shown in broken lines for the frustoconical internal shape of the outer wedge or housing 414 illustrated in FIG. 18. The frustoconical shape of the passage 520 of the slip member 514 mates frictionally with the frustoconical portion 508 of the torque body 502 when the two components 502 and 514 are assembled with one another. The tightness of the frictional fit between the slip member 514 and the torque body 502 controls the degree of slippage therebetween. The slip member 514 is preferably formed of an alloy of corrosion resistant, i.e., "stainless" steel, and the torque body 502 is preferably formed of bronze to provide the desired degree of friction between the two components.

The second end 518 of the slip member 514 includes a collar 522 extending concentrically therefrom, with the collar 522 serving as an alignment and retaining member for the thrust bearing of the clutch assembly 500. The thrust bearing comprises at least one, and preferably two, bronze thrust washers 524a and a Teflon thrust washer 524b installed about the collar 522 of the slip member 514 and bearing against the second end 518 of the slip member 514, the slip member 514 being disposed around the second end 506 of the torque body 502. While some type of rotating bearing might be used for this thrust bearing assembly, e.g., ball bearings, roller bearings, etc., it has been found that a pair of bronze thrust washers 524a sandwiching a Teflon® (polytetrafluoroethylene; Teflon is a registered trademark of E.I. du Pont de Nemours and Company of Wilmington Del.) ring or thrust washer 524b serve well as the thrust bearing means of the clutch assembly 500. More or fewer such washers 524a and/or 524b may be used, if desired. The bronze material of which the thrust washers 524a are made provides good frictional properties when they bear against the stainless steel material of the second end 518 of the slip member 514.

A compressive force is applied to the thrust washers 524a and 524b against the second end 518 of the slip member 514 by at least one concentric spring disposed above the thrust washer(s) 524a and 524b, capturing the thrust washer(s) 524a, 524b between the spring(s) and the second end 518 of the slip member 514. The at least one compressive spring preferably comprises a pair of corrosion-resistant steel Belleville washers 526, i.e., washers having a slightly conical configuration allowing them to deform resiliently under compression. The resilient properties of the Belleville spring washers 526 may be selected as needed, and the orientation of the washers 526 relative to one another provides for further adjustment of the resilience of the assembly.

A retaining nut assembly threads onto the threaded portion 512 of the second end portion 506 of the torque body 502. The thrust washers 524a, 524b and the compression members 526 are all captured by the retaining nut assembly and compressed toward the slip member 514, the frustoconical passage 520 of the slip member 514 thereby being compressed against the frustoconical portion 508 of the torque body 502 by the retaining nut assembly. The retaining nut assembly may comprise a single corrosion-resistant steel threaded adjuster nut 528 that bears against the compression member(s) 526, but preferably includes a second corrosion resistant steel nut 530 above the adjuster nut 528 to serve as a lock nut 530 for the assembly. The friction between the torque body 502 and the slip member 514 may be adjusted by adjusting the adjuster nut 528 as required, and then tightening the lock nut 530 tightly against the adjuster nut 528 to prevent rotation of the two nuts 528, 530 about the threaded area 512 of the second end portion 506 of the torque body 502.

The clutch assembly 500 operates optimally and most consistently if the assembly is kept substantially free of contamination from foreign matter. Accordingly, removable first and second end caps 532 and 534 are installed over the first end 504 of the torque body 502 and over at least the lock nut 530 of the retaining nut assembly installed about the second end 506 of the torque body 502, respectively, thus sealing opposite ends of the wedge clutch assembly. Each of these two end caps 532 and 534 has a central passage therethrough, the passage 536 of the second end cap 534 being visible in FIG. 21. The passages of the two end caps 532 and 534 are dimensioned to fit closely about the drive shaft (not shown) upon which the clutch assembly 500 is installed. The second end cap 534 further includes an internal O-ring groove 538 within its passage 536, and a resilient O-ring 540 is installed within the groove 538 to seal about the drive shaft. The circumferential interior corner (not shown) of the first end cap 532 is rounded to relieve stress concentrations, and the corresponding circumferential edge of the first end 504 of the torque body 502 is rounded correspondingly for proper fit of the first end cap 532 to the torque body 502. The two end caps 532, 534 may be formed of plastic for resilience and further sealing properties.

Additional O-ring grooves and O-rings are provided about the torque body 502 to provide additional protection from contamination. The torque body 502 includes a circumferential first O-ring groove 542 about the first end portion 504 thereof, and the frustoconical portion 508 has a circumferential second O-ring groove 544 near the first end portion 504 and a third circumferential O-ring groove 546 near the opposite second end portion 506 of the torque body 502. Corresponding first through third resilient O-rings 548, 550, and 552 are installed within the three grooves 542 through 546. The first O-ring 548 serves to seal the gap between the first end cap 532 and the first end 504 of the torque body 502 and the closely fitting passage (not shown) of the first end cap 532 and the drive shaft upon which the clutch assembly 500 is installed. The second and third O-rings 550 and 552 serve to substantially seal the mating frustoconical friction surfaces of the torque body 502 and slip member 514 from contamination working its way therebetween.

The clutch assembly 500 is configured for installation in the propeller hub of the drive system of a boat or other watercraft, and serves to prevent damage to the propeller or drive due to excessive torque to the drive in the event the propeller contacts an object. Accordingly, certain components have outer peripheries configured to fit or mate within the conventional housing of such a drive system. The slip member 514 has a substantially circular outer periphery, as shown in FIG. 21, but the circular outer periphery is broken by a series of flats 554 distributed therearound. These flats serve to prevent the slip member 514 from rotating within the housing of the drive system. Similarly, the first and second end caps 532 and 534 have circular outer peripheries with flats 556 distributed therearound, in conformity with the interior configuration of the housing in which the clutch assembly 500 is installed.

It is to be understood that the present invention is not limited to the embodiments described above, but encompasses any and all embodiments within the scope of the following claims.

I claim:

1. A wedge clutch assembly, comprising:
a housing having an upper opening and a lower opening;
an inner wedge disposed within the housing, the inner wedge having a passage formed therethrough adapted for receiving a drive shaft, the inner wedge including:
an upper externally threaded neck having annular threads formed on a portion thereof;
a frustoconical section adjacent the threaded neck, the upper externally threaded neck projecting through the upper opening of the housing, the frustoconical section being disposed within, and covered by, the housing;
an increased diameter section depending from the frustoconical section and extending outwardly from the housing through the lower opening formed therethrough, the increased diameter section having a diameter greater than the diameter of the upper externally threaded neck; and a lower section adjacent the increased diameter section, the lower section having a diameter less than the diameter of the increased diameter section;

a thrust bearing mounted about a lower portion of the upper externally threaded neck, the thrust bearing abutting the housing when the inner wedge is assembled therewith;

at least one wedge clutch spring washer disposed about the neck adjacent the thrust bearing;

a fastener threaded on the upper externally threaded neck above the wedge clutch spring washer for adjusting an applied torque to the inner wedge; and a seal flange mounted about an upper portion of the upper externally threaded neck above the fastener;

wherein the housing and the inner wedge are adapted for placement within a cavity of a clutch, the seal flange being adapted for sealing an upper end of the cavity from external contamination.

2. The wedge clutch assembly as recited in claim 1, wherein said inner wedge is circular in cross section.

3. The wedge clutch assembly as recited in claim 1, wherein said wedge clutch spring is made of steel.

4. The wedge clutch assembly as recited in claim 1, wherein said inner wedge is made of bronze.

5. The wedge clutch assembly as recited in claim 1, further comprising a first gasket mounted about the lower section, the first gasket being adapted for sealing a lower end of the cavity from external contamination.

6. The wedge clutch assembly as recited in claim 5, wherein the wedge spring washer is compressible.

7. The wedge clutch assembly as recited in claim 6, further comprising a pair of washers, said thrust bearing being sandwiched therebetween.

8. The wedge clutch assembly as recited in claim 7, further comprising a second gasket positioned about said seal flange.

9. The wedge clutch assembly as recited in claim 8, wherein said seal flange has a central opening formed therethrough, a third gasket being mounted within the central opening.

10. The wedge clutch assembly as recited in claim 1, wherein said housing is substantially hexagonal in cross section.

11. The wedge clutch assembly as recited in claim 1, wherein said housing is made of hardened steel.

12. The wedge clutch assembly as recited in claim 1, wherein said seal flange is made of plastic.

13. A conical clutch assembly, comprising:
a torque body having:
  a large diameter, generally cylindrical first end portion;
  a small diameter, generally cylindrical second end portion opposite the first end portion, the second end portion having a threaded area disposed thereon; and
  a generally medial frustoconical portion between the first end portion and the second end portion; the torque body defining a passage extending completely therethrough from the first end portion to the second end portion;
a slip member having a first end, a second end opposite the first end, and a frustoconical passage extending completely therethrough from the first end to the second end, the frustoconical passage mating frictionally with the frustoconical portion of the torque body when the slip member is installed thereon;
at least one thrust bearing disposed about the second end portion of the torque body, the at least one thrust bearing abutting the second end of the slip member;
at least one spring washer disposed about the second end portion of the torque body, the at least one thrust bearing being disposed between the spring washer and the second end of the slip member; and
at least one retaining nut adjustably threaded upon the threaded area of the second end portion of the torque body, the at least one spring washer and the at least one thrust bearing being captured between the at least one retaining nut and the second end of the slip member.

14. The conical clutch assembly according to claim 13, wherein the torque body has a first O-ring groove disposed about the first end portion thereof, a second O-ring groove disposed about the frustoconical portion adjacent the first end portion, and a third O-ring groove disposed about the frustoconical portion adjacent the second end thereof, the conical clutch assembly further comprising first, second, and third O-rings seated within the first, second, and third O-ring grooves, respectively.

15. The conical clutch assembly according to claim 13, further including:
a first end cap removably disposed over the first end portion of the torque body, the first end cap having a passage disposed concentrically therethrough;
a second end cap removably disposed over the second end portion of the slip member, the second end cap having a passage disposed concentrically therethrough, the passage having an O-ring groove disposed circumferentially therearound; and
an O-ring disposed within the O-ring groove of the second end cap.

16. The conical clutch assembly according to claim 15, wherein each said end cap has a generally circular outer periphery having a plurality of flats disposed thereon.

17. The conical clutch assembly according to claim 15, wherein each said end cap is formed of plastic.

18. The conical clutch assembly according to claim 13, wherein the slip member has a generally circular outer periphery having a plurality of flats disposed thereon.

19. The conical clutch assembly according to claim 13, wherein:
the at least one thrust bearing comprises a plurality of thrust bearings;
the at least one spring washer comprises a plurality of spring washers; and
the at least one retaining nut comprises an adjuster nut and a lock nut.

20. The conical clutch assembly according to claim 13, wherein:
the torque body is formed of bronze;
the at least one thrust bearing comprises a pair of bronze thrust washers and a polytetrafluoroethylene ring disposed between the bronze thrust washers; and
the slip member, the at least one spring washer, and the at least one retaining nut are formed of corrosion-resistant steel.

* * * * *